US012722225B2

(12) United States Patent
Kleiner et al.

(10) Patent No.: US 12,722,225 B2
(45) Date of Patent: Sep. 1, 2026

(54) METHOD FOR SEPARATING A WORKPIECE

(71) Applicant: TRUMPF Laser- und Systemtechnik GmbH, Ditzingen (DE)

(72) Inventors: Jonas Kleiner, Leonberg (DE); Daniel Flamm, Ludwigsburg (DE); Henning Rave, Stuttgart (DE); Marc Sailer, Villingen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 762 days.

(21) Appl. No.: 18/181,579

(22) Filed: Mar. 10, 2023

(65) Prior Publication Data

US 2023/0211439 A1 Jul. 6, 2023

Related U.S. Application Data

(63) Continuation of application No. PCT/EP2021/072942, filed on Aug. 18, 2021.

(30) Foreign Application Priority Data

Sep. 11, 2020 (DE) ..................... 10 2020 123 789.8

(51) Int. Cl.
*B23K 26/0622* (2014.01)
*B23K 26/064* (2014.01)
(Continued)

(52) U.S. Cl.
CPC ...... *B23K 26/0624* (2015.10); *B23K 26/0648* (2013.01); *B23K 26/067* (2013.01); *B23K 26/36* (2013.01); *B23K 2103/56* (2018.08)

(58) Field of Classification Search
CPC ............ B23K 26/0624; B23K 26/0648; B23K 26/067; B23K 26/36; B23K 26/0676; B23K 26/364; B23K 2103/56
(Continued)

(56) References Cited

U.S. PATENT DOCUMENTS

| | | | | |
|---|---|---|---|---|
| 5,736,709 A * | 4/1998 | Neiheisel | .......... | B23K 26/0665 219/121.75 |
| 6,433,303 B1 | 8/2002 | Liu et al. | | |

(Continued)

FOREIGN PATENT DOCUMENTS

| | | |
|---|---|---|
| CN | 105050764 A | 11/2015 |
| CN | 111432976 A | 7/2020 |

(Continued)

*Primary Examiner* — Elizabeth M Kerr
*Assistant Examiner* — Simpson A Chen
(74) *Attorney, Agent, or Firm* — LEYDIG, VOIT & MAYER, LTD.

(57) ABSTRACT

A method for separating a workpiece along a separation line by using laser pulses of a laser beam includes splitting the laser beam into a plurality of partial laser beams using a beam splitter optical unit, focusing the plurality of partial laser beams onto a surface of the workpiece and/or into a volume of the workpiece using a focusing optical unit, so that the plurality of partial laser beams are arranged next to one another and spaced apart from one another along the separation line, and ablating material of the workpiece along the separation line by introducing the laser pulses of the plurality of partial laser beams into the workpiece. The laser power per partial laser beam is adjusted depending on an ablation depth obtained in the workpiece.

19 Claims, 14 Drawing Sheets

(51) Int. Cl.

| | |
|---|---|
| ***B23K 26/067*** | (2006.01) |
| ***B23K 26/36*** | (2014.01) |
| ***B23K 103/00*** | (2006.01) |

(58) Field of Classification Search
USPC .................................................... 219/121.69
See application file for complete search history.

(56) References Cited

U.S. PATENT DOCUMENTS

| | | | | |
|---|---|---|---|---|
| 9,691,923 | B2 | 6/2017 | Brunton et al. | |
| 10,955,290 | B2 | 3/2021 | Odanaka | |
| 12,186,833 | B2 | 1/2025 | Richerzhagen et al. | |
| 2002/0003320 | A1 | 1/2002 | Temple et al. | |
| 2002/0170891 | A1 | 11/2002 | Boyle et al. | |
| 2005/0056626 | A1 | 3/2005 | Gross et al. | |
| 2007/0298529 | A1 | 12/2007 | Maeda et al. | |
| 2012/0234807 | A1 * | 9/2012 | Sercel | B23K 26/40 219/121.68 |
| 2015/0246848 | A1 | 9/2015 | Ikenoue et al. | |
| 2016/0045979 | A1 | 2/2016 | Kawaguchi et al. | |
| 2016/0121426 | A1 | 5/2016 | Hollinger et al. | |
| 2019/0067049 | A1 | 2/2019 | Cheng et al. | |
| 2019/0101443 | A1 | 4/2019 | Odanaka | |
| 2019/0139799 | A1 | 5/2019 | Vanagas et al. | |
| 2021/0165234 | A1 * | 6/2021 | Tillkorn | G02B 3/0075 |
| 2022/0032398 | A1 * | 2/2022 | Kumkar | B23K 26/0652 |
| 2023/0241711 | A1 * | 8/2023 | Kleiner | B23K 26/067 219/121.72 |

FOREIGN PATENT DOCUMENTS

| | | | | |
|---|---|---|---|---|
| DE | 19607376 | A1 | 8/1997 | |
| DE | 60210770 | T2 | 8/2006 | |
| DE | 69735729 | T2 | 1/2007 | |
| DE | 102007037133 | A1 | 3/2008 | |
| DE | 102012200915 | A1 | 7/2013 | |
| DE | 102014203525 | A1 * | 8/2015 | B23K 26/361 |
| DE | 102017203671 | A1 | 9/2018 | |
| DE | 102018216924 | A1 | 4/2019 | |
| DE | 102018205545 | A1 | 10/2019 | |
| DE | 102018211972 | B4 | 4/2020 | |
| JP | 2015167969 | A | 9/2015 | |
| JP | 2019063828 | A | 4/2019 | |
| WO | WO 2011116968 | A2 | 9/2011 | |
| WO | WO 2014080822 | A1 | 5/2014 | |
| WO | WO 2014194179 | A1 | 12/2014 | |
| WO | WO 2016137819 | A1 | 9/2016 | |
| WO | WO 2020016362 | A1 | 1/2020 | |

* cited by examiner

X, 10
X03
X02
X01
300
302
L
L
264, 24
262, 24
260, 24
T0
Time
X, 10
1
300
302
300
302
300
302
y

METHOD FOR SEPARATING A WORKPIECE

CROSS REFERENCE TO RELATED APPLICATIONS

This application is a continuation of International Application No. PCT/EP2021/072942 (WO 2022/053271 A1), filed on Aug. 18, 2021, and claims benefit to German Patent Application No. DE 10 2020 123 789.8, filed on Sep. 11, 2020. The aforementioned applications are hereby incorporated by reference herein.

FIELD

Embodiments of the present invention relate to a method for separating a workpiece along a separation line by using laser pulses of a laser beam.

BACKGROUND

The practice of separating workpieces by impingement with laser pulses is known, for example for the purpose of separating a portion of the workpiece out of the workpiece, with material ablation in the workpiece being able to be achieved by way of the laser beam impinging on the workpiece, the ablation for example being able to be achieved by sublimation of the workpiece or by fusing, with the melt subsequently being driven out.

However, the effectiveness of the cutting process may reduce with increasing processing depth on account of shadowing and a change in the hole geometry, and so the energy of the laser may therefore no longer be sufficient to bring about fast material ablation. Expressed differently, the energy required for material ablation increases with increasing processing depth, and so each point along a desired separation line, along which the workpiece is intended to be separated, must be swept over multiple times by the laser beam, as a result of which the processing time is directly proportional to the number of traverses.

In this context, it is known to use what are known as multi-spot optics for the purpose of forming a multiplicity of partial laser beams and to use these partial laser beams by means of a scanner and/or displacement stage for the purpose of separating the workpiece. The material ablation can be fashioned more effectively by the multiplicity of simultaneously introduced partial laser beams.

Although this already leads to an overall reduction in the processing time and an increase in the efficiency, such methods are still disadvantageous in that a drop in efficiency of the material ablation with increasing processing depth is not compensated for. In other words, the material ablation becomes slower with increasing processing depth, with the result that multiple and time-consuming sweeping of the partial laser beams over the separation line nevertheless is required again in the case of an increasing ablation depth.

Furthermore, apparatuses are known (WO 2020/016362A1), by means of which it is possible with the aid of microlens arrays to form an arrangement of partial laser beams arranged next to one another along a line, with the number of partial laser beams being made possible by varying the distance between the various microlens arrays. In this case, the energy of the laser beam made available by the laser can be split among a plurality of partial laser beams, with the result that the energy of the partial laser beams varies with the number of partial laser beams. However, this method is not provided for the separation of a workpiece.

SUMMARY

Embodiments of the present invention provide a method for separating a workpiece along a separation line by using laser pulses of a laser beam. The method includes splitting the laser beam into a plurality of partial laser beams using a beam splitter optical unit, focusing the plurality of partial laser beams onto a surface of the workpiece and/or into a volume of the workpiece using a focusing optical unit, so that the plurality of partial laser beams are arranged next to one another and spaced apart from one another along the separation line, and ablating material of the workpiece along the separation line by introducing the laser pulses of the plurality of partial laser beams into the workpiece. The laser power per partial laser beam is adjusted depending on an ablation depth obtained in the workpiece.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
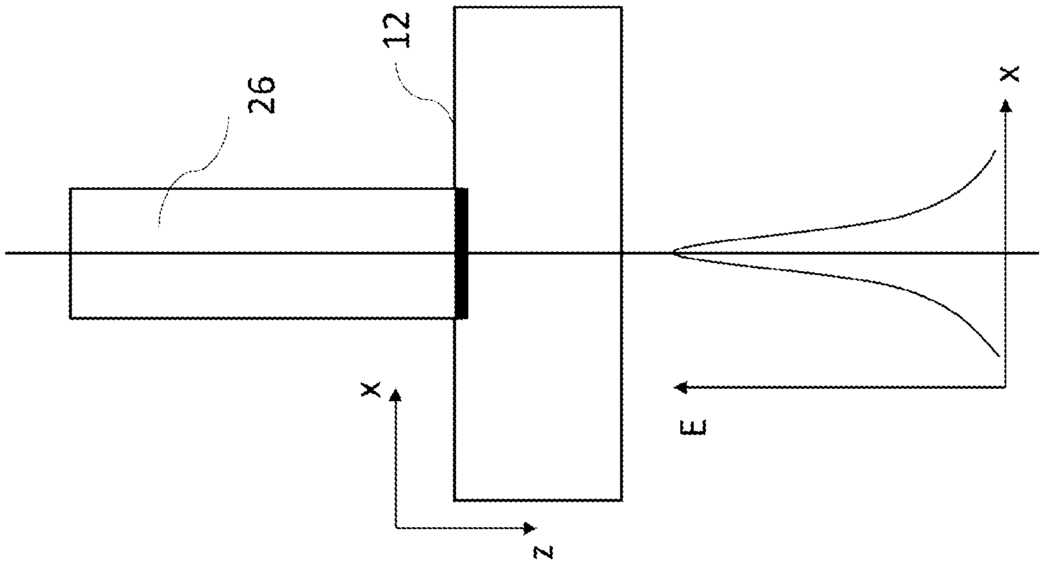
FIGS. 1A and 1B show a schematic representation of the method without an adjustment of the laser intensity according to some embodiments.

Embodiments of the present invention provide a method for separating a workpiece along a separation line by means of laser pulses of a laser beam, with the laser beam being split by means of a beam splitter optical unit into a plurality of partial laser beams and each of the partial laser beams being focused by way of a focusing optical unit onto the surface and/or into the volume of the workpiece so that the partial laser beams are arranged next to one another and spaced apart from one another along the separation line. According to embodiments of the invention, material ablation occurs along the separation line as a result of the introduction of the laser pulses into the workpiece, and the laser power per partial laser beam is adjusted depending on the ablation depth obtained in the workpiece.

In this case, the laser makes the laser pulses available, with the laser pulses moving along a beam axis defined by the optical unit of the laser, as a result of which the laser beam of the laser is provided accordingly along this beam axis. The laser preferably is a short pulse laser providing pulses in the nanosecond range or an ultrashort pulse laser providing laser pulses in the picosecond range or femtosecond range.

Ultrashort pulse lasers emit laser pulses with a particularly high energy density over a short timescale, as a result of which particularly sharp edges arise along the separation line. In this case, the pulse length of an ultrashort laser pulse can be for example shorter than 100 ps, in particular shorter than 10 ps, particularly preferably shorter than 1.5 ps. However, the pulse length can for example also be longer than 300 fs. Typically, the pulse length is 1 ps. The peak fluence, that is to say the intensity of either the incident laser beam or a partial laser beam, can be between 0.3 J/cm$^2$ and 30 J/cm$^2$, and it is typically between 1 J/cm$^2$ and 5 J/cm$^2$. The focal diameter of the incident laser beam or a partial laser beam can be between 1 μm and 100 μm, and the focal diameter can particularly preferably be 9 μm.

The focal diameter of a non-radially symmetric beam profile can generally be defined by way of the second moments of the power density distribution of the beam profile, as described in ISO 11146-3: "Lasers and laser-related equipment—Test methods for laser beam widths, divergence angles and beam propagation ratios—Part 3: Intrinsic and geometrical laser beam classification, propagation and details of test methods", with the shorter of the two principal axes of the beam profile being assumed to be the focal diameter in this case.

The laser beam of the laser is guided through a beam splitter optical unit which for example comprises a beam splitter cube, which for example splits the entering laser beam into two partial laser beams of equal intensity. A beam splitter optical unit may however also comprise an optical element which divides the beam into a plurality of partial laser beams and which deflects the partial laser beams so that all partial laser beams run parallel to one another and at a certain distance from one another. A beam splitter optical unit may also comprise a plurality of optical elements, with one element splitting the entering laser beam or beams into a plurality of partial laser beams and another element deflecting the partial laser beams into parallel directions.

By way of example, a beam splitter optical unit can ensure that an entering laser beam is split into five or ten or more partial laser beams.

A beam splitter optical unit moreover makes it possible to efficiently distribute high pulse energies of a pulsed laser into various partial laser beams, with the result that the efficiency of the processing process can be increased. In particular, all partial laser beams may have the same laser energy or else have different laser energies. By way of example, the variation of the laser energy from partial laser beam to partial laser beam may be up to 50% or more. By way of example, the partial laser beams may have an increase or decrease in the laser energy along one or more directions, with the result that the bundle of partial laser beams has an energy gradient. In particular, such energy gradients can be generated in a targeted fashion by means of coherent beam combination, or individual spots can be switched off.

The separation line is understood to mean the line along which the workpiece should be separated. By way of example, a separation line can be provided in the form of a straight line. However, a separation line can also be a curved line. In particular, a separation line can also be part of a more complex separation line or separation geometry.

For example, if the intention is to cut a rectangular shape out of a workpiece, the separation line may for example be only a sideline of the rectangle but also be specified by the entire contour to be cut out.

The partial laser beams are arranged next to one another and spaced apart from one another along the separation line. In this case, the distance between adjacent partial laser beams is the distance between the geometric centers of the partial laser beams along the separation line. However, the distance may also be determined between the intensity maxima of adjacent partial laser beams along the separation line. The start and end points of the distance measurement may also be those points at which the laser beam or the beam axis intersects the surface of the workpiece.

The distance between adjacent partial laser beams can be the same size for all adjacent partial laser beams. By way of example, each partial laser beam can be at a distance of 5 μm or 10 μm or 100 μm from its neighbor. However, the distances between adjacent partial laser beams may also vary. Thus, for example, a partial laser beam may have a distance of 5 μm or more from one neighbor but only a distance of 3 μm or 10 μm or less from the other neighbor.

In particular, a flexible beam split, in the case of which the partial laser beams have adjustable distances, numbers of spots and spot intensities, may also be realized by coherent beam combining.

In particular, each partial laser beam only has two direct neighbors since the partial laser beams are arranged along the separation line.

The number of partial laser beams and the spacings thereof can be chosen so that partial laser beams are arranged at a distance from one another along the entire desired separation line. In other words, the entire region to be separated, which is defined by the separation line, is covered by partial laser beams.

Each partial laser beam is focused using a focusing optical unit. By way of example, the focusing optical unit may comprise lenses or other diffractive elements, which convergently deflect the partial laser beam into a focal zone. In particular, this means that the intensity of the partial laser beam is brought together into a minimal spatial region within the focal zone. B y way of example, the focusing optical unit may be provided on an individual basis for each partial laser beam. However, it is preferable for all partial laser beams to be focused using one focusing optical unit.

It may also be the case that the focusing optical unit deflects partial laser beams, which are incident on the focusing optical unit at different angles of incidence or which do not have parallel beam axes, onto parallel beam axes. In particular, this means that all partial laser beams are oriented parallel to one another following the passage through the focusing optical unit. However, it may also be the case that the beam axes are deflected to divergent or convergent beam axes by way of the focusing optical unit. By way of example, this may be advantageous if shadowing effects of the material edge in the process zone should be avoided within the scope of a material ablation process. By way of example, such divergent beam axes can be realized using a non-telecentric objective or a non-telecentric optical structure.

By way of example, the focusing optical unit may be adapted to the beam splitter optical unit such that the partial laser beams emanating from the beam splitter optical unit are incident on the focusing optical unit at different angles and these partial laser beams are then oriented parallel to one another again by the focusing optical unit. By way of example, this can be achieved if the beam splitter optical unit is in the focus of the focusing optical unit. By way of example, the focusing optical unit and the beam splitter optical unit may also be in conjugate planes to one another.

The partial laser beams can be focused onto the surface and/or into the volume of the workpiece. This means that the focal zone is located, for example, exactly on the surface of the material or in the beam direction below the surface of the material. All partial laser beams are preferably focused into the same plane.

In a development in which a separate focusing optical unit is provided for each partial laser beam, it is however also possible for one partial laser beam to be focused exactly onto the surface while another partial laser beam is focused into the volume of the material.

The partial laser beams are focused by a focusing optical unit such that each partial laser beam converges in a focal zone. This means that the intensity of the laser beam is highest in the focal zone. By way of example, in the case of a Gaussian beam profile, the geometric focal zone in this case can be specified by a focus in which an intensity maximum of the beam occurs. However, the geometric focal zone can also be the intensity maximum of a non-Gaussian beam, for example of a beam with a flat-top focal zone or of a non-diffractive beam, for example a Bessel beam or a Bessel-like beam, in particular a Bessel-Gaussian beam. The shape of the focal zones can vary depending on the utilized beam profile.

The introduction of the laser pulses into the workpiece along the separation line may be tantamount to the laser pulses being wholly or partially absorbed by the workpiece. By way of example, this may lead to the workpiece being heated significantly by the laser pulses. This may lead to the heated material of the workpiece detaching from the overall composite of the workpiece as a result of melting or subliming. In particular, this can mean laser ablation or laser drilling or laser cutting.

In particular, the effectiveness of the cutting procedure may reduce with increasing processing depth when the material is removed from the workpiece. In this case, the processing depth is the distance between the original workpiece surface and the new workpiece surface in the trench along the separation line, which has been generated by the laser pulses of the partial laser beams as a result of ablation processes. In particular, the processing depth may be at different depths along the separation line, for example because the workpiece is nonplanar or placed unevenly on a workpiece holder, or because the workpiece has different densities or different layers which react differently to the introduced partial laser beams or the partial laser beams used to entrench the trench have had different energies from the start of the method and, accordingly, a different ablation speed of the individual regions of the separation line processed by the respective partial laser beams has led to different processing depths.

The effectiveness of the cutting procedure in this case describes what ablation or ablation depth is possible with a given amount of laser energy. By way of example, the effectiveness of the cutting procedure may decrease with increasing processing depth, but the effectiveness of the cutting procedure may also increase, depending on the workpiece characteristics.

If the laser power is adjusted per partial laser beam, this may mean that, as a result of the adjustment, more laser energy is introduced with each partial laser beam than would be introduced in the case of a non-adjusted partial laser beam. However, this may also mean that less laser energy is introduced with each partial laser beam than in the case of a non-adjusted partial laser beam.

The adjustment of the laser energy of the partial laser beams depends on the ablation depth, meaning that the effectiveness of the material ablation at the respective ablation depth is taken into account here when adjusting the laser energy of the partial laser beams. By way of example, if the partial laser beams efficiently ablate material from the workpiece at a first ablation depth and ablate material less efficiently at a second ablation depth because the laser power of the partial laser beams is too low, then it is possible to increase the laser power of the partial laser beams.

However, the efficiency of the material ablation may also relate to the ablation per unit time, with the result that material ablation must have occurred over a certain length along the separation line after a given amount of time. By way of example, the laser power per partial laser beam can be adjusted inasmuch as a maximum speed of the material ablation along the separation line is obtained. In particular, there can also be an optimization in relation to ablation depth and ablation length along the separation line. In particular, it is also possible to optimize the ablation volume, that is to say the totality of ablated material from the workpiece, with an adjustment of the power per partial laser beam.

The advantage of the proposed method consequently lies in the increase in the efficiency and the edge quality of the cutting process for a workpiece, for example silicon, as a result of the continuous utilization of the available laser power. In this case, the ablation power per unit time at the respective position processed by the respective partial laser beam can for example be kept substantially constant.

The laser power can be adjusted per partial laser beam by virtue of the number of partial laser beams being adjusted for a given input power of the laser.

This may mean that it is particularly efficient to ablate the material of the workpiece using a first number of partial laser beams at a first ablation depth. In this case, the laser power of the laser is divided among the first number of partial laser beams by the beam splitter optical unit.

By way of example, the laser beam can be split into five partial laser beams, with the result that each partial laser beam introduces a fifth of the laser energy into the workpiece.

By way of example, the efficiency of the ablation with five partial laser beams can be very high at a first ablation depth but the efficiency of the ablation with five partial laser beams may be very low at a second ablation depth. Should this be the case, the number of partial laser beams can for example be reduced to four partial laser beams for the second ablation depth so that each partial laser beam then already introduces a quarter of the laser power of the laser into the material of the workpiece. By virtue of the laser power of the partial laser beams being increased at the second ablation depth, it is thus possible to also increase the efficiency of the ablation process again.

By way of example, however, the five partial laser beams may introduce more than enough energy for the ablation process into the workpiece at a second ablation depth, with the result that the efficiency of the method can be increased by virtue of increasing the number of partial laser beams from five partial laser beams to six partial laser beams. Although each partial laser beam introduces less energy into the workpiece as a result, this energy is simultaneously introduced into the workpiece by a greater number of partial laser beams, and so simultaneous processing may occur at more positions. As a result, the portion along the separation line along which simultaneous processing is carried out by the partial laser beams can be increased, in turn rendering the ablation process more efficient.

The laser power per partial laser beam can be increased with increasing ablation depth.

This may mean that, for example, the laser power of the input laser is increased with increasing ablation depth but it may also mean that the number of partial laser beams is reduced with increasing ablation depth such that, in the case of an unchanging laser power of the laser, available laser energy is divided among fewer partial laser beams. As a result, the laser energy that can be introduced into the workpiece with each partial laser beam increases.

The beam splitter optical unit may comprise a plurality of microlens arrays and, for example, consist of the latter. By way of example, four microlens arrays may be provided.

Microlens arrays comprise arrangements of a plurality of microlenses. In this case, microlenses are small lenses, in particular lenses with a typical distance ("pitch") from lens center to lens center of 0.1 to 10 mm, preferably 1 mm, with each individual lens of the arrangement being able to have the effect of a normal, macroscopic lens.

The plurality of microlens arrays are used to generate an angle spectrum from the (at least substantially) collimated input laser beam, the angle spectrum being imaged by way of a Fourier lens arrangement into a focus plane which is typically located on or in the workpiece to be processed. Depending on the spacing of the microlens arrays, a multiplicity of partial laser beams arise in the process as a result of interference and diffraction effects. A variation in the number of partial laser beams follows from the variable modification of the interference pattern. The fluence and intensity of the spots of the partial laser beams in this case is inversely proportional to the number of partial laser beams, with the sum of the laser powers of the partial laser beams substantially corresponding to the laser power of the input laser beam.

The focus plane is used synonymously for the focal plane of the partial laser beams. The microlens arrays line up microlenses in (at least) one direction perpendicular to the beam propagation direction. An overall beam profile with uniform spacings of the partial laser beams is generated in the focus plane, with the partial laser beams being lined up in a direction, for example the X-direction, perpendicular to the beam propagation direction. Hence, the partial laser beams may be lined up in the direction in which the microlenses (for example formed as cylindrical lenses) are also lined up.

Use is preferably made of four microlens arrays, through which the laser beam passes. On the one hand, four microlens arrays still allow a simple and compact structure. On the other hand, this already renders the number of partial laser beams flexibly adjustable.

The beam splitter optical unit may also comprise at least two microlens array pairs which each comprise two microlens arrays, with the microlens arrays of a microlens array pair having a fixed distance from one another.

By way of example, this means that one microlens array pair can be displaced relative to another microlens array pair. By way of example, the distance of a first microlens array may be fixedly set vis-à-vis a third microlens array. By way of example, the distance of a second microlens array may be fixedly set vis-à-vis a fourth microlens array at the same time. At the same time, the relative distance of the first microlens array pair from the second microlens array pair may be varied. However, it is also possible that other combinations of microlens arrays are fixedly interconnected in order to keep the distance constant.

As a result of arranging two microlens arrays at a fixed distance, it is possible to restrict or specify the degrees of freedom of the optical arrangement in a targeted manner in order to be able to more easily set the number of partial laser beams.

The laser power of the partial laser beams and/or the number of partial laser beams can be adjusted by virtue of the two microlens array pairs being displaced relative to one another.

By displacing the microlens array pairs with respect to one another, there is a change in the interference pattern, that is to say a change in the number of partial laser beams.

To this end, use can be made of an adjustment mechanism for changing the optical spacings of at least some of the microlens arrays in the beam path. As a result, the effective focal length of the totality of microlens arrays, and hence the number of partial laser beams, is rendered adjustable. What can be achieved by a suitable choice of the adjustment positions of the adjustment mechanism is that a uniform intensity distribution is achieved over the various partial laser beams.

In this case, the adjustment mechanism can be motor-driven and can comprise an electronic control apparatus, with the various adjustment positions associated with the various numbers of partial laser beams being programmed in the electronic control apparatus and being able to be homed-in on in automated fashion by means of the electronic control apparatus. This enables a convenient and fast switchover between different numbers of partial laser beams whenever the next processing task is ready to be dealt with.

A first and a third microlens array may be arranged in a stationary fashion in the beam path itself and the second and fourth microlens arrays situated in the beam path may be arranged in a displaceable carriage, or vice versa. Then, there is over a certain adjustment range of the carriage a linear relationship between the number of partial laser beams and the carriage position, as a result of which the number of partial laser beams can be set particularly conveniently.

A microlens array or a microlens array pair may comprise convex microlenses.

In this case, convex microlenses have what is known as a virtual focus upstream of the microlens in the beam propagation direction. A microlens array made of convex lenses is also referred to as a convex microlens array.

If the incident laser beam is incident on a convex microlens array, the beam is expanded. In particular, this reduces the intensity of the laser beam in the beam propagation direction downstream of the convex microlens array. This can prevent damage to the further optical elements in the beam path.

The partial laser beams can be focused into the same focal plane.

This may mean that the distance of all geometric foci in the partial laser beam direction have the same distance from the surface. By way of example, all partial laser beams can be focused exactly onto the surface. However, all partial laser beams may also be focused 10 below the surface of the workpiece, for example. However, all foci of the partial laser beams may also be located in a plane perpendicular to the beam propagation direction, independently of a surface topology of the workpiece.

This is advantageous in that the separation procedure and the ablation depth are well controllable and a uniform separation edge arises.

The partial laser beams can be moved away from their original position along the separation line by a deflection value.

To achieve a precise separation of the workpiece, the movement of the partial laser beams preferably follows the separation line. In particular, in the case of a straight separation line, the movement of the partial laser beams preferably is a linear deflection that follows the straight shape of the separation line and, in the case of a curved separation line, the deflection of the partial laser beams preferably is a deflection that follows the curved shape of the separation line.

In this case, the original position is the position which the partial laser beams originally adopt on the surface of the workpiece. In particular, the original position is the position of the partial laser beams before a deflection movement or movement away has taken place. In this case, the deflection value is the maximum distance of the moved partial laser beam from its original position. The deflection value is measured in a manner analogous to the distance of the various partial laser beams along the separation line.

The laser emits laser pulses while the partial laser beams are moved. As a result of the movement, it is consequently possible to introduce the laser pulses along the separation line. In particular, it is thus possible that laser pulses are introduced into the workpiece along the entire separation line.

By way of example, the partial laser beams can be moved along the separation line using a scanner system so that the laser beams are introduced into the workpiece along the separation line and the workpiece is separated along the separation line. In particular, this can be achieved by way of a scanner system which can preferably be arranged downstream of the beam splitter optical unit in the beam propagation direction and which guides the partial laser beams along the separation line.

The movement of the partial laser beams is preferably correlated with the repetition rate of the laser providing the laser beam in order to ensure uniform material ablation.

In the case of a constant speed of the movement of the partial laser beams, the repetition rate or pulse rate of the laser can accordingly be chosen so that the separation line is swept over without gaps. By way of example, this may mean that the repetition rate has to be 10 MHz in the case of a movement speed of 10 μm/μs and a focal diameter of 1 μm. This ensures that the partial laser beam sweeps over each point of the separation line, and introduces laser pulse energy, during its movement. However, this may also mean, in particular, that the repetition rate is chosen to be significantly faster such that the focal zones of successively introduced laser pulses of the same partial laser beams overlap, that is to say that the distance of successively introduced laser pulses is smaller than the focal diameter or the diameter of the focal zone.

By contrast, if the movement speed is not constant, the repetition rate or the pulse rate can be adapted to the speed of the movement. By way of example, in the case of a non-uniform movement along the separation line, few laser pulses may be introduced during the movement in slow movement portions, where the speed of the movement is particularly small, while particularly many laser pulses have to be introduced during the fast movement portions of the movement, where the movement speed is high. By way of example, the pulse rate can consequently be inversely proportional to the movement speed. In particular, this may also apply to the periodic movements discussed below.

Consequently, it is possible to introduce the laser energy of the partial laser beams with a uniform distribution along the separation line, with the result that uniform material ablation is ensured. In particular, uniform material ablation is expressed by virtue of the fact that the ablation depth is substantially the same size along the separation line (provided the material surface is flat).

The partial laser beams can firstly be moved away from their original position along the separation line by a deflection value, the deflection value being less than or equal to the distance between two adjacent partial laser beams, preferably equal to the distance between the partial laser beams, and the partial laser beams can subsequently be moved back into the original position along the separation line, the movement being able to be a periodic movement in particular.

The deflection value is less than or equal to the distance between two adjacent partial laser beams, preferably equal to the distance between the partial laser beams. In particular, this may mean that a first partial laser beam is moved to the original position of the adjacent second partial laser beam as a result of the movement. At the same time, the second partial laser beam for example can be moved to the original position of an adjacent third partial laser beam, with the third partial laser beam and the first partial laser beam not being identical, etc. This ensures that laser pulses are introduced into the workpiece along the entire separation line.

However, the first partial laser beam may also only be moved to the halfway point of the distance to the adjacent partial laser beams. The partial laser beams may also move two thirds of the distance in the direction of the separation line and subsequently, following the return to the original position, move a third of the distance counter to the separation line. In particular, a movement along both directions of the separation line is possible.

Following the deflection, the partial laser beams are moved back into the original position again along the separation line. In terms of absolute value, the return movement may proceed with the same velocity as the previous movement. However, the return movement may also have a different speed profile.

All partial laser beams preferably carry out the same movement at the same time.

The laser emits laser pulses while the partial laser beams are moved. As a result of the movement, it is consequently possible to introduce the laser pulses along the separation line. The introduction of the laser pulses may be tantamount to the laser pulses being wholly or partially absorbed by the material. By way of example, this may lead to the material being heated significantly by the laser pulses. This may lead to the heated material detaching from the overall composite of the material.

This is advantageous in that the traversed line per partial laser beam, that is to say the deflection value, may be significantly shorter than if an arrangement of partial laser beams, that is to say the totality of partial laser beams generated by the beam splitter optical unit, needs to be guided over the entire workpiece. Consequently, it is possible to dispense with complicated axis or scanner positioning and alignment for the actual separation process. By way of example, the overshoot beyond the edges of the workpiece, within the scope of which the workpiece holder may be damaged, is also dispensed with. Overall, the method allows individual components on the workpiece, for example on a silicon wafer, to be machined without the entire wafer having to be machined at once. Thus, overall, the flexibility in respect of different component geometries on the workpiece is increased.

A periodic movement means that the partial laser beams are deflected starting from their original position and return back to their original position again after a fixed time interval. In particular, this may mean that the deflection is implemented along the separation line and the partial laser beams, after reaching the deflection value, once again return to the original position and this is followed by a deflection counter to the separation line and the partial laser beams, after reaching the deflection value, once again return to the original position. However, it may also be the case that the periodic movement occurs between the original position of a partial laser beam and the original position of an adjacent partial laser beam.

In other words, the partial laser beams carry out a wobble movement, preferably a periodic wobble movement, along the separation line proceeding from the initial position.

Preferably, following the implementation of at least one movement of the partial laser beams away from the original position by a deflection value and back into the original position again, the original position is displaced along the separation line by a displacement value and the movement of the partial laser beams is carried out anew. In particular, the displacement value can also be implemented using a scanner system in this case. This embodiment is preferably chosen if the bundle of partial laser beams cannot cover the entire separation line or if a scanning movement should additionally be overlaid on the feed movement, for example at high speeds and/or in the case of complex structures, and the separation along the separation line must accordingly be carried out incrementally. In this case, the displacement value preferably corresponds to the extent of the bundle of the partial laser beams in the separation line direction.

In other words, the simultaneous processing breadth specified by the bundle of the partial laser beams, to which the away and return movement have been applied, is used as a displacement value so that the simultaneous processing breadths are successively placed next to one another. As a result, a processing or separation of the workpiece along the separation line initially occurs in a first processing breadth and, following the completion of the separation of this portion of the separation line corresponding to the processing breadth, the bundle of partial laser beams is displaced by the displacement value such that a separation in processing breadth can once again occur here.

However, it is preferable if each structure to be separated from the workpiece can be separated using one processing breadth of the bundle of partial laser beams without displacement. To this end, the number of partial laser beams and the distances thereof from one another are preferably adapted in such a way that a simultaneous processing of the entire length essential to the respective structure can be achieved. In other words, attempts are preferably made to for example cut one side of a chip at the same time.

The separation line can be straight and the periodic movement of the laser beams can be a linear deflection.

This may mean in particular that the separation line is not curved, that is to say has no geometric curvature. The partial laser beams can only be moved along the separation line, and therefore there is a linear deflection if the partial laser beams are guided along a straight separation line.

In other words, the partial laser beams are preferably always located on the separation line, even when implementing their wobble movement.

Preferably, following the implementation of at least one movement of the partial laser beams away from the initial position by a deflection value and back into the initial position again, the initial position is displaced along the separation line by a displacement value and the movement of the partial laser beams is carried out anew. This embodiment is preferably chosen if the bundle of partial laser beams is unable to cover the entire separation line and the separation along the separation line accordingly needs to be implemented incrementally. In this case, the displacement value preferably corresponds to the extent of the bundle of the partial laser beams in the separation line direction.

In other words, the simultaneous processing breadth specified by the bundle of the partial laser beams, to which the away and return movement have been applied, is used as a displacement value so that the simultaneous processing breadths are successively placed next to one another. As a result, a processing or separation of the workpiece along the separation line initially occurs in a first processing breadth and, following the completion of the separation of this portion of the separation line corresponding to the processing breadth, the bundle of partial laser beams is displaced by the displacement value such that a separation in processing breadth can once again occur here.

The periodic movement of the partial laser beams can be generated by a periodic movement of the focusing optical unit.

Accordingly, the focusing optical unit can be moved mechanically, for example be displaced laterally, that is to say perpendicularly to the beam direction. However, this may also mean that the focusing optical unit is tilted at an angle with respect to the beam direction.

As a result of the different points of incidence of the partial laser beams on the focusing optical unit, the partial laser beams run along different beam paths through the focusing optical unit, with the result that the partial laser beams, following the departure from the focusing optical unit, are imaged onto a different location in or on the workpiece. The movement amplitude of the focusing optical unit therefore largely defines the deflection value along the separation line. If the focusing optical unit is not deflected, the imaging of the partial laser beams onto the workpiece defines the original position of the partial laser beams on the workpiece.

When a microlens array is used, a movement of the partial laser beams can be generated in particular by displacing an element within the microlens array arrangement.

The pulsed laser can be an ultrashort pulse laser.

An ultrashort pulse laser emits laser pulses with a particularly high power density over a short timescale, as a result of which particularly sharp edges may arise along the separation line. In this case, the pulse length of an ultrashort laser pulse can be for example shorter than 100 ps, in particular shorter than 10 ps, particularly preferably shorter than 1.5 ps. However, the pulse length can for example also be longer than three hundred femtoseconds. Typically, the pulse length is 1 ps. The peak fluence, that is to say the intensity of either the incident laser beam or a partial laser beam, can be between 0.3 $J/cm^2$ and 30 $J/cm^2$, and it is typically between 1 $J/cm^2$ and 5 $J/cm^2$. The focal diameter of the incident laser beam or a partial laser beam can be between 1 μm and 100 μm, and the focal diameter can particularly preferably be 9 μm.

The partial laser beams and the workpiece can be displaced relative to one another; in particular, they can be displaced with a feed along a feed direction.

A displacement of partial laser beams and workpiece relative to one another means that both the partial laser beams and/or the workpiece are able to move, with an offset of the partial laser beams relative to the original position of the two objects being achieved by the movement of one or both objects.

In particular, the displacement can be achieved by a scanner or axis system, for example an XYZ-stage, which is able for example to displace the workpiece in all spatial directions. A wobble movement can be overlaid on this displacement.

The feed can have a feed speed along a feed direction. This means that the relative movement has a certain speed, with the result that the partial laser beams are guided relatively over the workpiece at a certain speed. In particular, the feed velocity vector is aligned parallel to the separation line, that is to say the feed direction is given by the separation line. Since laser pulses are introduced into the workpiece by the pulsed laser during the movement, there is material ablation along the separation line.

The input laser beam and/or the partial laser beams can be decomposed into two mutually orthogonal polarization components during the passage through a birefringent polarizer element.

Birefringence is understood to mean the capability of an optical material to separate the incident laser beam into two partial laser beams with perpendicular polarization with respect to one another. This happens on account of different refractive indices of the optical material depending on the polarization and the angle of incidence of the light relative to the optical axis of the optical material.

Within the meaning of this application, partial laser beams polarized perpendicularly to one another are understood to mean linearly polarized partial laser beams whose polarization directions are oriented at an angle of 90° to one another. However, partial laser beams polarized perpendicularly to one another are also understood to mean circularly polarized partial laser beams having an opposite rotation sense, that is to say two left and respectively right circularly polarized partial laser beams. The conversion of linearly polarized partial laser beams having polarization directions oriented perpendicularly to one another into circularly polarized partial laser beams having an opposite rotation sense can be effected with the aid of a suitably oriented retardation plate (quarter-wave plate), for example.

The emergent laser beams decomposed according to polarization components by the birefringent polarization element may have an angular offset and/or spatial offset with respect to one another.

This can also be explained by the anisotropy of the refractive index for different polarization directions of the optical material of the polarization element.

By way of example, the partial laser beams may have an angular offset after passing through the birefringent polarization element. This means that the partial laser beam with a first polarization downstream of the birefringent polarization element does not run parallel to the partial laser beam with a second polarization.

In order to produce the angular offset (without a spatial offset), the birefringent polarizer element can have a beam exit surface that is inclined at an angle with respect to the beam entrance surface. In this case, the optical axis of the birefringent crystal is typically aligned parallel to the beam entrance surface. In this case, at the beam exit surface, the two partial laser beams emerge from the birefringent crystal at the same position and with a defined angular offset.

By way of example, the partial laser beams may have a spatial offset after passing through the birefringent polarization element. This means that the partial laser beam with the first polarization downstream of the birefringent polarization element runs parallel to the partial laser beam with the second polarization. However, the two partial laser beams are shifted parallel to one another such that there is a finite distance between the two partial laser beams.

In order to produce the spatial offset (without an angular offset), the birefringent polarizer element can have for example generally planar beam entrance and beam exit surfaces aligned parallel. In this case, the optical axis of the birefringent crystal is typically oriented at an angle with respect to the beam entrance surface. If the input laser beam impinges on the beam entrance surface perpendicularly, a pure spatial offset is produced at the beam exit surface.

The distances between the individual partial laser beams with different polarization can be defined by way of the polarization element, for example during the production thereof or by way of the orientation of the optical axis of the crystal with respect to the incident laser beam.

The partial laser beams arranged next to one another and at a distance from one another along the separation line may have an alternating polarization.

The polarization is alternating if adjacent partial laser beams have mutually orthogonal polarizations. By way of example, the polarization is alternating if a first partial laser beam has a right circular polarization, a second partial laser beam has a left circular polarization, a third partial laser beam has a right circular polarization, etc. By way of example, the polarization is alternating if a first partial laser beam is polarized along the separation line, a second partial laser beam is polarized orthogonal to the separation line, a third partial laser beam is polarized along the separation line, etc.

If a laser beam which, for example, is generated by a single-mode laser and has a Gaussian beam profile is split into two or more partial laser beams and the partial laser beams are at least partially superposed, this can result in undesired interference effects if the partial laser beams have the same or a similar polarization. Therefore, during the focusing of the partial laser beams, the focal zones or the focal cross sections cannot be arbitrarily close together, and so the partial laser beams are generally focused at focal zones spaced apart from one another on the workpiece.

With the use of partial laser beams having mutually perpendicular polarization states, the (partial) superposition does not give rise to interference effects of the laser radiation from different spatial or angular ranges, provided that the polarization state of the respective partial laser beams is uniform over the entire relevant beam cross section or the respective focal zone. The polarization of a respective partial laser beam should therefore vary as little as possible over the beam cross section or over the focal zone as a function of position. In this case, the focal zones can be arbitrarily close to one another, partly or possibly completely overlap and even form homogeneous focal zones, specifically both transversely, that is to say perpendicularly to the direction of propagation of the partial laser beams, and longitudinally, that is to say in the direction of propagation of the partial laser beams.

The polarization of each partial laser beam can be aligned along the separation line or orthogonal to the separation line.

Polarized along the separation line may mean that, in the case of a linear polarization, the polarization axis is parallel to the separation line. In the case of curved separation lines, this may mean that the polarization axis is tangential to the separation line, with the focus being located on the separation line. Especially in the case of a straight separation line, this may mean that the polarization axis is fully on the separation line.

Aligned orthogonal to the separation line may mean that, in the case of a linear polarization, the polarization axis is orthogonal to the separation line. In the case of curved separation lines, this may mean that the polarization axis is orthogonal to the tangent of the separation line, with the focus being located on the separation line and the tangent being formed at the focus.

By way of example, a higher quality cutting result, for example with an increased break resistance, can be obtained in the case of a polarization perpendicular to a feed direction, that is to say perpendicular to the separation line, in the case of a silicon wafer. By way of example, a workpiece can be ablated with a high efficiency with a polarization parallel to the feed direction.

However, depending on the material, the effect of the polarization may also be precisely converse or different, with the result that, in the case of a polarization parallel to the feed direction, it is possible to obtain a higher-quality cutting result than with a polarization perpendicular to the feed direction. In any case, the cutting quality can be influenced by way of the polarization.

All partial laser beams may have the same polarization as a result of a retardation plate and/or retardation element and a filter element.

By way of example, a retardation plate can be a half-wave plate, by means of which a linear polarization of the incident laser light can be rotated. By way of example, a half-wave plate can convert a p-polarization into an s-polarization. However, a retardation plate can also be a quarter-wave plate, by means of which a circular polarization is converted into a linear polarization. By way of example, the incident laser beam may have a circular polarization and have a p-polarization after the laser light has passed through the quarter-wave plate.

By way of example, a filter element can be a polarizer, for example a thin film polarizer, or any other polarizer element. In particular, the filter element can be attached downstream of the polarizer element of the processing optical unit. In particular, the filter element can also be switched into the beam path or be switched off.

What this can achieve is that one of the polarizations is filtered out of the beam path downstream of the polarizer element, with the result that only partial laser beams with one polarization direction are still introduced into the workpiece.

The entire separation process may be divided into various partial separation processes, with each partial process being carried out either with p- or s-polarized partial laser beams or with partial laser beams of different polarizations.

The use of partial laser beams with different polarization is advantageous inasmuch as the different polarization directions relative to the separation line have an effect on the ablation depth per pulse and on the quality of the ablation edge. By way of example, a polarization parallel to the feed direction is suitable for enabling particularly efficient material ablation per laser pulse. By contrast, a polarization perpendicular to the feed direction can generate particularly smooth edges with a high break resistance.

By way of example, a certain ablation depth can be achieved in a first step using partial laser beams polarized parallel to the feed direction. By way of example, the cut edge can be post-processed in a second step using partial laser beams polarized perpendicular to the separation line. In particular, it is also possible to define different sequences, according to which the separation line is traversed with the partial laser beams of different polarization. In particular, it is also possible that partial laser beams with different polarization are introduced simultaneously.

By way of example, the partial laser beams of different polarization may be placed next to one another. As a result of the different polarizations there are no bothersome interference effects between adjacent partial laser beams, with the result that the partial laser beams can be placed close together.

Consequently, it is possible to obtain an increase in efficiency and quality by processing the workpiece with different polarizations along or perpendicular to the separation line in different processing situations within the scope of different processing strategies.

By way of example, the polarization of the partial laser beams can be defined by way of a polarizer. By way of example, this can be a thin film polarizer which only passes partial beams of one polarization. By way of example, such a polarizer can be introduced into the beam path before the partial laser beams are steered onto the workpiece. In particular, the polarization of the partial beams can also be defined directly by the polarizer element, with it being possible to adjust the alignment of the optical axis with respect to the incident beam. Consequently, it is possible to determine and select the polarization of the partial beams.

In the case of alternating use of parallel and perpendicular polarization, the effects in relation to quality and efficiency can be used simultaneously. It is likewise possible to divide the process into two or three or more process steps. In this case, a high efficiency and an increase in the economy of the process can be attained, for example at the start of the process, by means of partial laser beams of alternating polarizations or exclusively parallel polarization. At the end of the process, the polarization can be rotated through 90°, for example by means of a half-wave plate or the switching of a liquid crystal, liquid crystal display, lithium niobate crystal or Pockels cell, with the result that a qualitative improvement of the workpiece is attained with a polarization aligned perpendicular to the feed direction.

The workpiece can be a wafer, in particular a silicon wafer, from which individual chips should be separated out.

What can be achieved as a result in chip manufacturing, in particular, is that the wafers now only need to be positioned accurately but no longer need to be aligned. This means that the alignment over the wafer along a feed axis no longer may deviate by a few micrometers over the entire wafer width.

Preferred exemplary embodiments are described below with reference to the figures. In this case, elements that are the same, similar or have the same effect are provided with identical reference signs in the different figures, and a repeated description of these elements is dispensed with in some instances, in order to avoid redundancies.

FIG. 1 schematically shows a method for separating a workpiece 1, for example for separating a wafer made of silicon, at two different times.

In FIG. 1A, a partial laser beam 26 is introduced into a workpiece 1, with the workpiece 1 for example being heated in the focal zone by the laser pulses which run along the partial laser beam 26 so that the heated material of the workpiece 1 detaches from the surrounding overall composite. This process is referred to as laser ablation or laser drilling or laser cutting.

At the start of the process in FIG. 1A, when the surface 12 is still flat, that is to say untreated in particular, the partial laser beam 26 strikes the surface 12 for example perpendicularly at all points. The partial laser beam 26 has a beam cross section, for example a symmetric beam cross section, for example as a result of a Gaussian beam profile, such that the laser intensity at the focus of the beam is greatest in the lateral direction and drops off towards the edge of the beam. Accordingly, the workpiece is heated more strongly in the center of the beam than at the edges of the beam, with the result that the material heated by the center of the beam is more likely to be detached from the workpiece than at the edge of the beam. As a result, the ablation depth per pulse is distributed unevenly across the beam cross section, as a result of which, as it were, the base of the hole becomes uneven.

Moreover, at the start of the processing procedure, the majority of the focal zone is located below the surface 12 or in the volume of the workpiece 1, with the result that, per laser pulse, a comparatively large amount of laser energy is absorbed by the material of the workpiece 1, as a result of which the processing process becomes very effective.

Figure 1B:
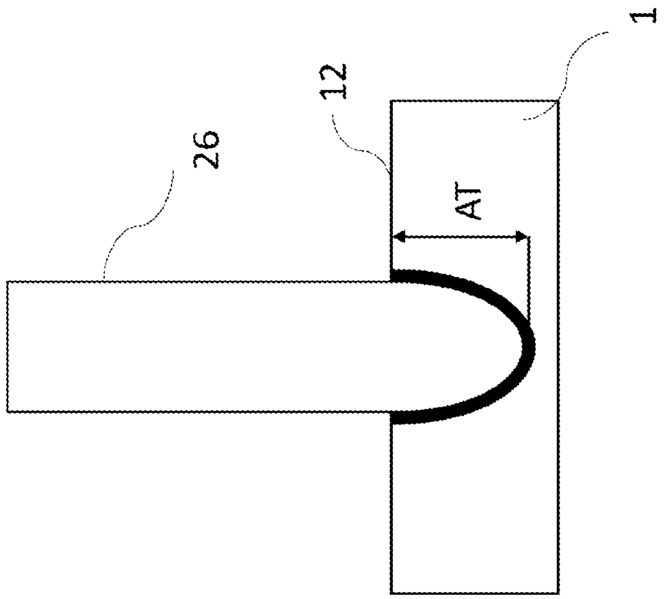

FIG. 1B shows that this unevenness is amplified with increasing ablation depth because the partial laser beam 26 with a radially decreasing beam profile detaches more and more material from the center of the hole in comparison with at the edge of the beam. In particular, the hole is formed in accordance with the intensity distribution in the beam profile, with the result that the area processed by the laser beam as the processing process advances increases significantly and the intensity drops in turn. In particular, this reduces the efficiency of the material ablation processing process. To increase the efficiency of the processing process, it is therefore necessary to increase the intensity of the partial laser beam 26 with increasing ablation depth.

Figure 2C:
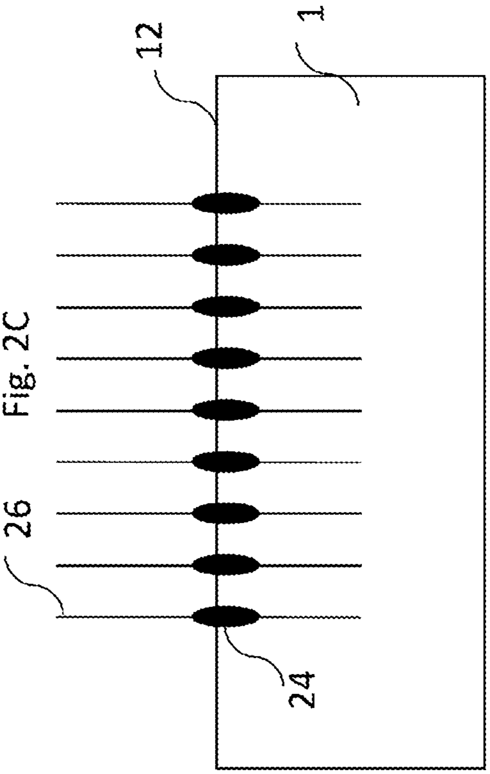
FIGS. 2A, 2B, and 2C show a sketch for determining the distance between the partial laser beams according to some embodiments.
Figure 2A:
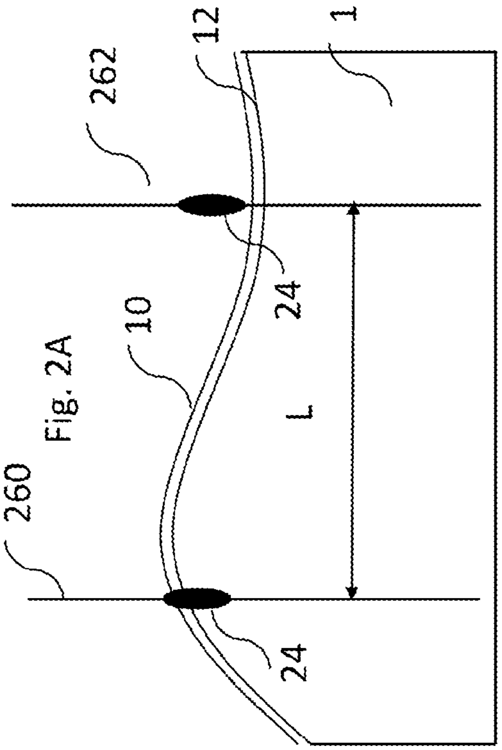

FIG. 2A shows a sketch to clarify the determination of the distance of the partial laser beams 26 from one another. In this context, it is assumed that the surface 12 of the workpiece 1 has a curvature or is uneven. However, the determination of the distance can be implemented analogously for flat surfaces 12. In this case, a beam splitter optical unit splits the laser beam 2 into a first partial laser beam 260 and a second partial laser beam 262. The first partial laser beam 260 runs substantially parallel to the second partial laser beam 262, with the focal zone 24 of the first partial laser beam 260 being located in the volume of the workpiece 1 and the focal zone 24 of the second partial laser beam 262 being located on the surface 12 of the workpiece 1. All that is relevant for determining the distance between the two partial laser beams is the direct distance L between the partial laser beams 260, 262, with the distance L being measured between the beam axes of the first and the second partial laser beam.

Figure 2B:
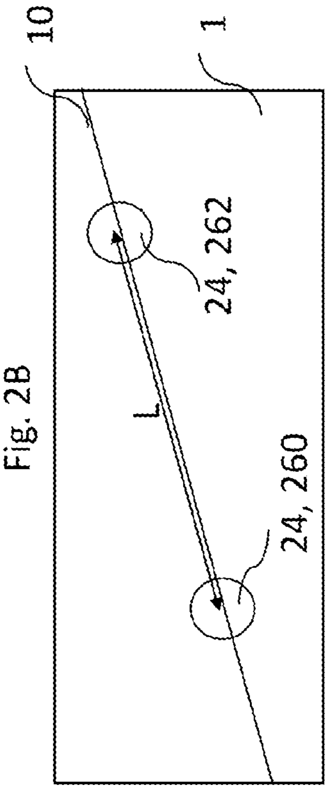

FIG. 2B shows the situation of FIG. 2A in a plan view. The two partial laser beams 260 and 262 are introduced into the workpiece 1 at a distance from one another and next to one another along the separation line 10. From the bird's eye view, the curvature of the surface 12 of the workpiece 1 is not visible, and so the direct geometric connection of the two beam axes of the partial laser beams 260 and 262 is suitable for determining the distance L between the two partial laser beams 260, 262.

FIG. 2C shows a further side view of the method; in particular, what is shown is that a multiplicity of partial laser beams 26 can be introduced into the workpiece 1. All partial laser beams 26 are focused into the same focal plane. This means that all focal zones are located in one plane. In this case, the focal plane is given by the surface 12 of the workpiece 1.

Figure 3:
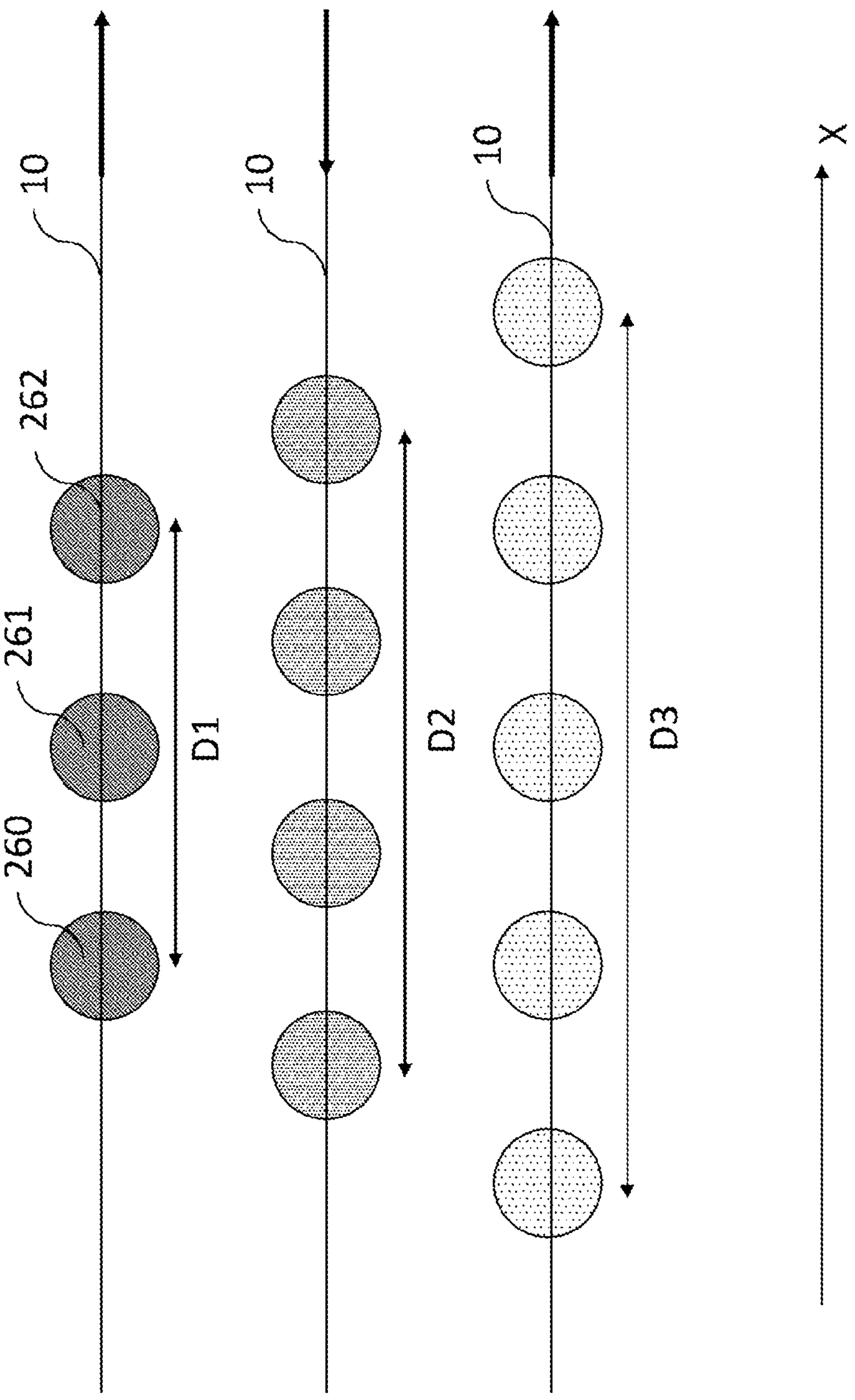
FIG. 3 shows a schematic representation of the dependence of laser intensity on the number of partial laser beams according to some embodiments.

FIG. 3 shows different partial beams, and the intensity thereof in the focal zone 24 depending on the number of partial laser beams 26 used. In the uppermost row, the incident laser beam (not shown here) is split into three partial laser beams 260, 261, 262. The intensity in the focal zones 24 of these three partial laser beams is very high, as indicated by the dark hatching. By way of example, the three partial laser beams can be introduced into the workpiece during a first traverse along the separation line 10, for example in the positive x-direction.

In the second row, the same incident laser beam (not shown here) is split into four partial laser beams. The four partial laser beams have a reduced intensity in the focal zone, indicated by a mid-tone hatching. In particular, the incident laser beam for generating the partial laser beams has not changed, all that has happened is that the intensity is adjusted by adjusting the number of partial laser beams. By way of example, the four partial laser beams can be used during a second traverse along the separation line 10 in the negative x-direction.

The third row shows five partial laser beams which have all been generated, once again, by the same incident laser beam. The five partial laser beams have a significantly lower intensity than the four partial laser beams and likewise a significantly lower intensity than the three partial laser beams. By way of example, five partial laser beams can be introduced into the workpiece during a third traverse along the separation line 10, once again in the positive x-direction.

Consequently, it is possible to adjust the intensity per partial laser beam purely by adjusting the number of partial laser beams, without having to modify the incident laser beam. Hence, the intensity introduced into the workpiece 1 by each laser pulse is also independent of the number of partial laser beams.

In particular, it is also possible to use a large number of partial beams during a first traverse along the separation line 10 and to reduce the number of partial beams during a further traverse along the separation line 10 such that the laser energy per partial laser beam is increased. In this sense, the first traverse was carried out in accordance with the third step and the last traverse in accordance with the first step.

In particular, the partial laser beams extend over an ever greater distance D with increasing number of partial laser beams, with the result that a smaller feed movement is required in order to sweep over the entire separation line 10. Hence, it is also possible to increase the process speed provided the introduced laser energy is sufficient for material ablation.

A number of traverses over the separation line 10 totaling of the order of 500 to 2500 individual traverses may be required in order to attain a separation of the material of the workpiece 1. In the process, an adjustment of the laser power per partial laser beam 26 can be carried out upon each traverse, or after a given ablation depth AT in the material of the workpiece 1 has been exceeded or after a given number of individual traverses; by way of example, the laser power per partial laser beam 26 is adjusted after 200 traverses.

Figure 4A:
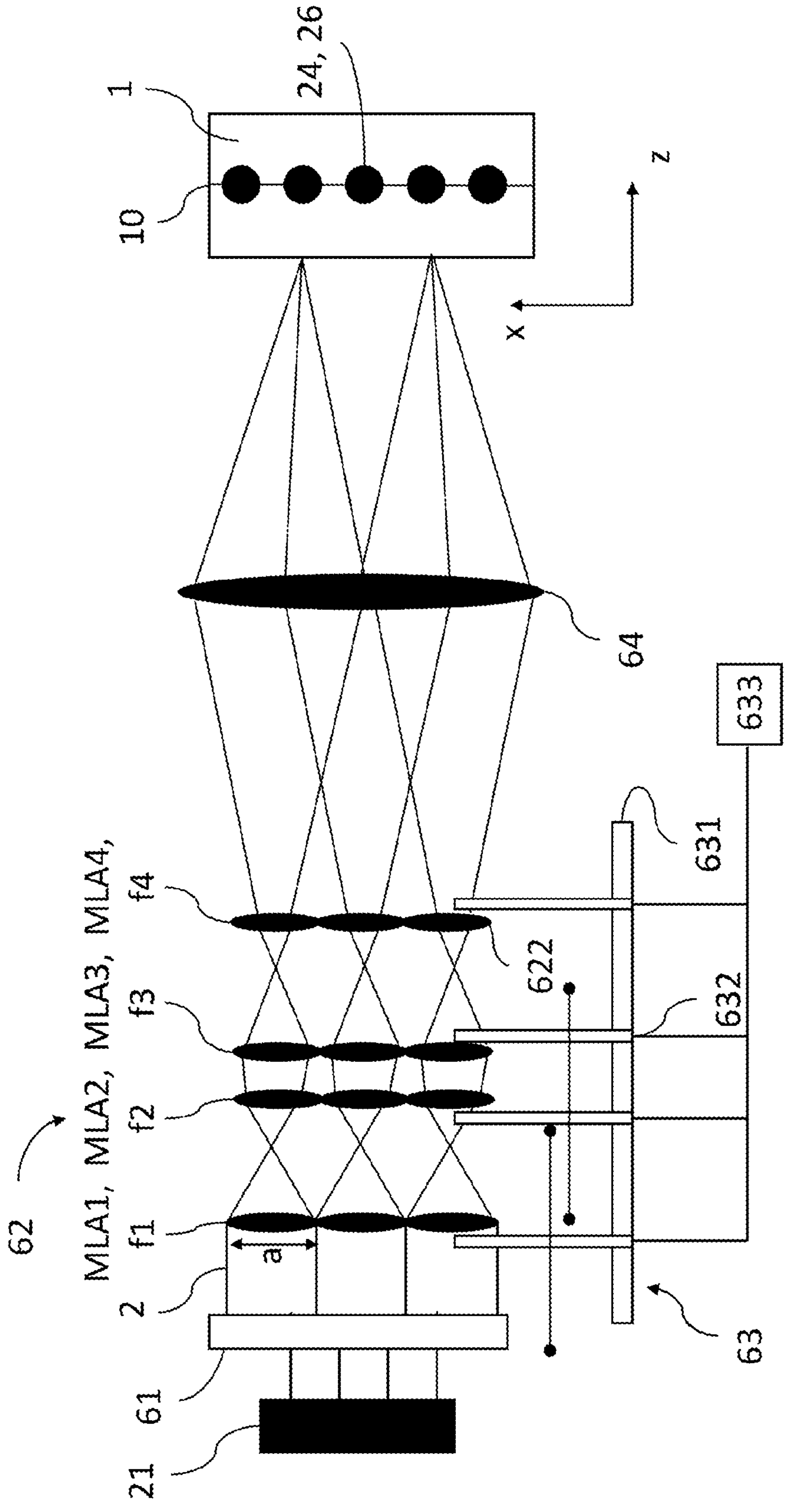
FIGS. 4A and 4B show a schematic representation of a microlens array optical unit according to some embodiments.

FIG. 4A shows a microlens array optical unit, that is to say a beam splitter optical unit 62 as used for beam splitting. An input laser beam 2 of a laser 21 is guided through an optional telescope optical unit 61 (depicted in dashed lines) in order to adapt the diameter of the laser beam 2, and subsequently guided through the microlens array optical unit in order to generate a plurality of partial laser beams 26. In this case, the input laser beam 2 is collimated at least in respect of the x-direction perpendicular to the beam propagation direction (z-direction).

The input laser beam 2 passes through four microlens arrays MLA1-MLA4. Each microlens array MLA1-MLA4 comprises microlenses 622 with an aperture a which are arrayed in the x-direction. The aperture a, as measured along the x-direction, is the same for all microlens arrays MLA1-MLA4. The microlens arrays MLA1-MLA4 or the microlenses 622 thereof can all have different focal lengths f1-f4. The focal length f1-f4 of the microlenses 622 is uniform within a respective microlens array MLA1-MLA4.

Figure 4B:
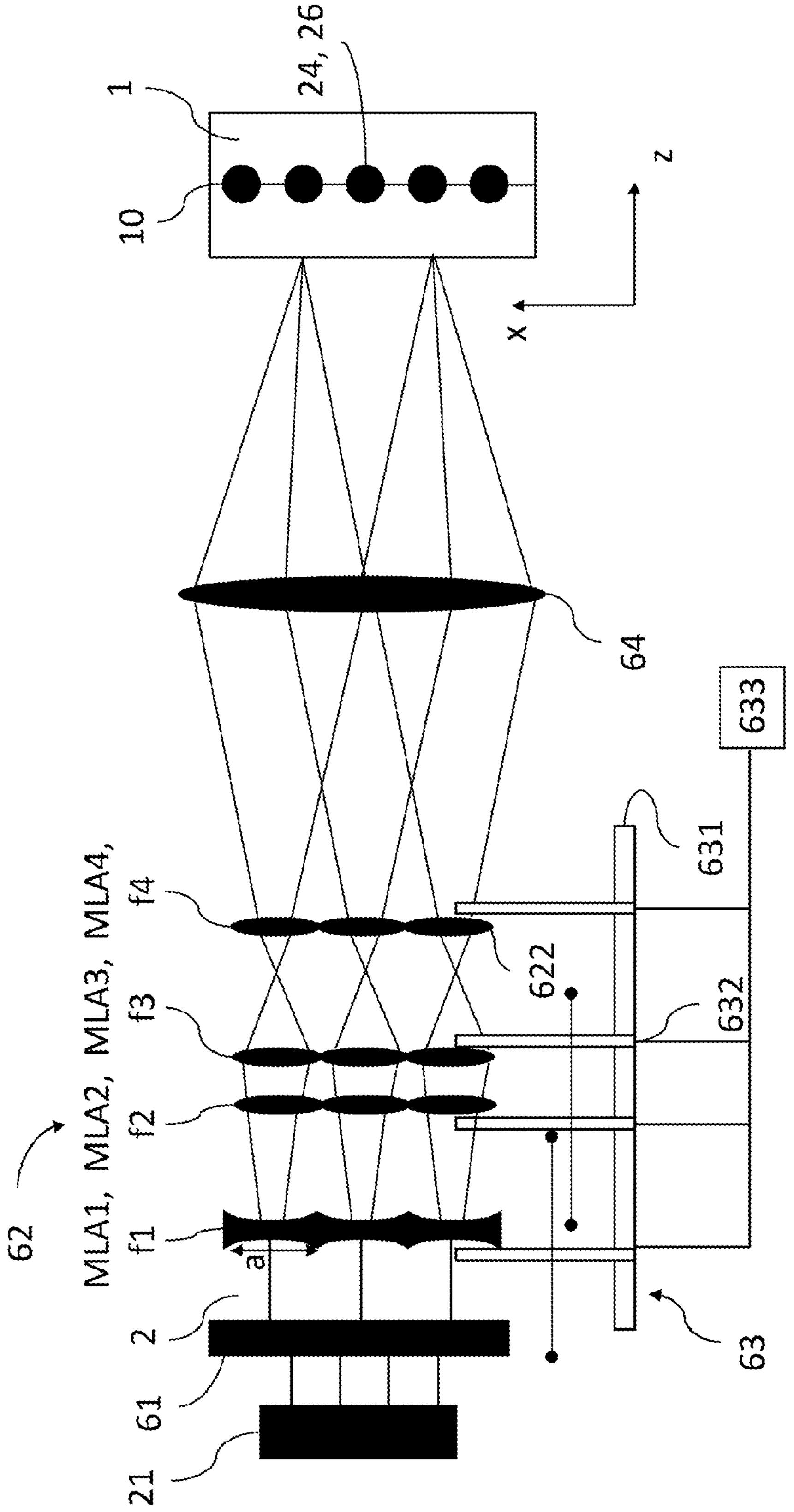

The microlenses 622 are all convex lenses in FIG. 4A. However, in an alternative embodiment shown in FIG. 4B, the microlenses 622 of the MLA1 are concave lenses and the microlenses of the MLA2-MLA4 are convex lenses. This enables a laser beam 2 expansion, with the result that the peak intensity of the laser beam 2 between the microlens arrays 622 is attenuated. This can avoid a destruction of the subsequent optical elements. However, the number of convex microlens arrays is restricted to two in the case of a structure with four microlenses.

As a result of the microlens arrays MLA1-MLA4, each point of a respective microlens in the plane of the first microlens array MLA1 is imaged into an angle, that is to say an angular spectrum is generated. This angular spectrum is imaged in a focus plane, for example into or onto a workpiece 1, using a focusing optical unit 6. In the process, the partial laser beams 26 arise as a result of interference and diffraction effects in the beam path.

The microlens array optical unit 62 comprises an adjustment mechanism 63, by means of which at least some of the mutual spacings of the microlens arrays MLA1-MLA4 can be adjusted. By way of example, each microlens array MLA1-MLA4 may be provided with, on a guide 631 (for instance, a rack), a dedicated carriage 632 that is displaceable in motor-driven fashion (for instance, with a driven gear that engages in the rack), with the carriages being able to be driven by way of an electronic control apparatus 633. A plurality of adjustment positions for the totality of the microlens arrays MLA1-MLA4 are stored in the control apparatus 633, with a respective adjustment position comprising a target position with respect to the z-direction to be homed in on by the various carriages 632.

It should be observed that the positions of a few microlens arrays MLA1-MLA4 can be coupled and/or stationary. By way of example, the first and the third microlens array MLA1 and MLA3 can be interconnected. By way of example, the second and the fourth microlens array MLA2 and MLA4 can also be interconnected. Then, the number of partial laser beams in the focus plane can be adjusted by an offset of the microlens array pairs relative to one another.

In general, the adjustment mechanism 63 can home in on a plurality of adjustment positions, with the number of partial laser beams 26 being able to be adjusted by way of the adjustment positions.

The generated partial laser beams 26 are focused into or onto the workpiece 1 by the focusing optical unit 64. By way of example, five partial laser beams 26 are generated in FIG. 4, said partial laser beams being positioned next to one another on a line, for example on the separation line 10, in the x-direction. In this case, the microlens arrays only have microlenses which are lined up in the x-direction, and none lined up in the y-direction. The laser beam has been focused in the focus plane in the y-direction, for instance by way of a cylindrical lens between the laser source and the first microlens array in the beam path.

The displaceable carriages 632 of the microlens array optical unit can be coupled to one another. By way of example, the drivable carriage of the first microlens array MLA1 can be coupled to the carriage of the third microlens array MLA3. By way of example, this may mean that the distance between the microlens arrays MLA1 and MLA3 is always the same. However, it may also be the case that the displaceable carriage of the first microlens array MLA1 is coupled to the carriage of the second microlens array MLA2. It may also be the case that more than two carriages are coupled to one another.

In particular, the coupled microlens arrays can be displaced vis-à-vis the uncoupled microlens arrays. By way of example, the microlens arrays MLA1 and MLA2 can be displaced vis-à-vis the microlens arrays MLA3 and MLA4. This means that the distance between the microlens arrays MLA1 and MLA2 or the microlens arrays MLA3 and MLA4 always remains the same, but the distance between the microlens arrays MLA2 and MLA3 varies. By displacing the microlens array pairs there is a change in the interference pattern of the various beams in the beam splitter optical unit, with the result that it is possible to adjust the number of partial laser beams 26 introduced into the workpiece. In this case, the intensity in the individual focal zones of the partial laser beams 26 is inversely proportional to the number of partial laser beams.

Finally, the number of partial laser beams can be guided over the workpiece using a scanner system or an axis system, with the result that the partial laser beams 26 sweep over the workpiece along a separation line 10 and cut the workpiece 1 along the separation line 10 as a result of the introduction of the laser pulses. Depending on the ablation depth and process advance, it is accordingly possible to adjust the number of partial laser beams 26 in order to increase the efficiency of the ablation process.

Figures 5A, 5B:
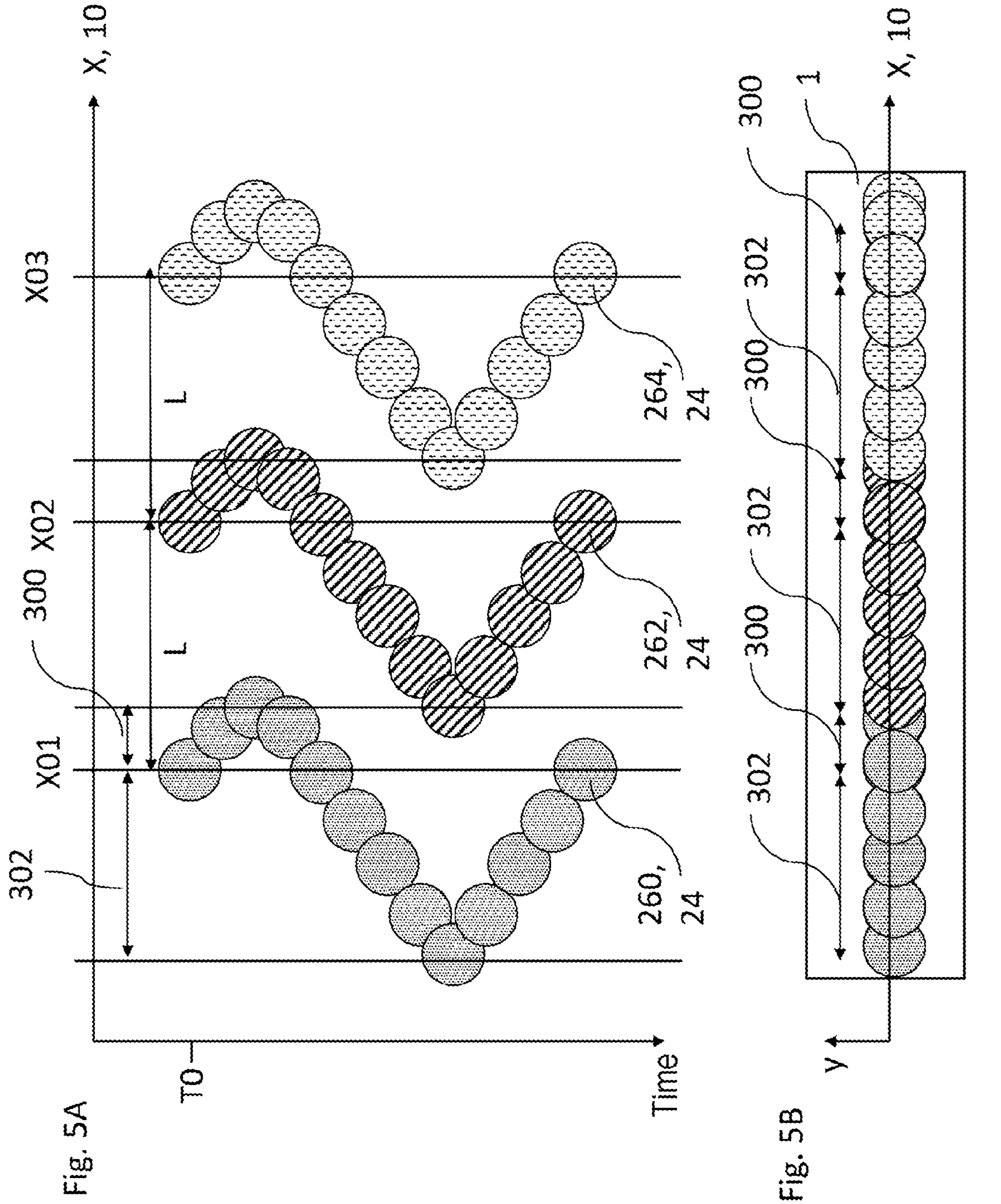
FIGS. 5A and 5B show a schematic representation of the time dependence when introducing the partial laser beams with a periodic deflection according to some embodiments.

FIG. 5A shows a further time profile of a possible movement and deflection of the partial laser beams 260, 262, 264. By way of example, these partial laser beams are generated during the passage of the laser beam 2 through a beam splitter optical unit according to FIG. 4 and are focused onto or into the workpiece 1 or the surface 12 of the workpiece 1 with the aid of a focusing optical unit. In the present embodiment, the partial laser beams have a uniform distance from one another, that is to say the distance L between two adjacent partial laser beams 26 is the same at all times.

Moreover, the x-axis of the diagram extends along the separation line 10 whereas the y-axis represents the time axis. The first partial laser beam 260 is focused into the workpiece 1 such that the laser pulses, for example of an ultrashort pulse laser, bring about material ablation in the focal zone 24 of the first partial laser beam 260. By way of example, this can be implemented by way of a mechanism known as laser ablation or laser drilling or laser cutting. A certain amount of material ablation is achieved by each pulse or each pulse train of the pulsed laser. However, this material ablation must be implemented uniformly along the separation line 10, for example in order to avoid material stresses.

The following description is provided explicitly for the first partial laser beam 260, but it applies analogously to the other partial laser beams. From its original position X01, the first partial laser beam 260 is initially deflected along the separation line 10, to be precise by the deflection value 300. By way of example, pulses are emitted continuously by the pulsed laser while the partial laser beam 260 is deflected. As a result, a total of three laser pulses are emitted along the path between the original point X01 and the point where the deflection value 300 is attained. Subsequently, the first partial laser beam 260 is moved back into its original position X01 again, with the result that a total of five laser pulses have been emitted when the original position X01 is reached. Subsequently, the partial laser beam 262 is moved counter to the separation line 10 until a deflection value 302 has been attained. In the figure, the deflection value 302 differs from the deflection value 300, with the result that the movement is asymmetric in particular. However, the deflection always occurs along the separation line 10. A total of nine laser pulses were emitted before the reversal point where the deflection value 302 is attained. Subsequently, the partial laser beam 260 is brought back into the original position X01, once again along the separation line 10, with an additional four laser pulses being introduced into the workpiece.

The movement within the scope of the first part of the movement, in which the laser pulses were introduced to the right of the original position, was carried out at a first speed. The movement within the scope of the second part of the movement, in which the laser pulses were introduced to the left of the original position, was carried out at a second speed. In particular, these movements can also be driven with a speed profile; by way of example, use can be made of sawtooth-shaped curves or sinusoidal curves or cosinusoidal curves or triangular curves. The pulse rate of the pulsed laser can be adapted in the process, with the result that the pulses are introduced uniformly into the workpiece 1 by each partial laser beam 26 on the separation line 10, as a result of which uniform material ablation takes place. In particular, the movement speed in this case may also be adapted to the deflection value, with the result that the same number of laser pulses are always introduced into the workpiece 1 per deflection value.

The partial laser beam 260 is introduced into the workpiece 1 together with the second partial laser beam 262 and the third partial laser beam 264. All partial laser beams are in their original points X01, X02, and X03 at the start time T0. Subsequently, all partial laser beams are displaced along the separation line 10 by the deflection value 300, subsequently returned to the original position, subsequently displaced counter to the separation line 10 by the deflection value 302, and ultimately returned back to the original positions. The distance L between the partial laser beams is always the same in this case. In this case, the deflection values 300, 302 along and counter to the separation line can be chosen so that the sum thereof corresponds exactly to the distance between the partial laser beams. This ensures that adjacent partial laser beams sweep over the same point on the separation line 10. By way of example, the second partial laser beam 262, at its maximum deflection by the deflection value 302 counter to the separation line 10, exceeds the same point on the separation line 10 which the first partial laser beam 260 reaches in the case of its maximum deflection value 300 along the separation line 10. The same applies analogously to the two partial laser beams 262 and 264. Since adjacent partial laser beams sweep over the same point on the separation line 10, uniform material ablation is consequently ensured. In particular, this ensures gap-free material ablation, with the result that no workpiece with the original thickness of the workpiece 1 remains along the separation line 10.

FIG. 5B shows the introduced laser pulses of the various partial laser beams 260, 262, 264 from the bird's eye view onto the workpiece 1. It is quite apparent that there is no point along the separation line 10 that was not swept by the partial laser beams, with the result that uniform material ablation is ensured.

Adjacent partial laser beams 260, 262, 264 cannot be introduced into the workpiece 1 at an arbitrarily small distance from one another if the adjacent partial laser beams have the same polarization. This is due to arising interference effects, as a result of which the adjacent partial laser beams partially cancel one another out (destructive interference) or amplify one another (constructive interference). By contrast, if adjacent partial laser beams have different, more particularly orthogonal polarizations with respect to one another, then the partial laser beams cannot interfere with one another. It is for this reason that the laser beam 2 can be split into different polarization components and the partial laser beams which are introduced into the workpiece 1 can in turn be formed from these polarization components.

Figure 6A:
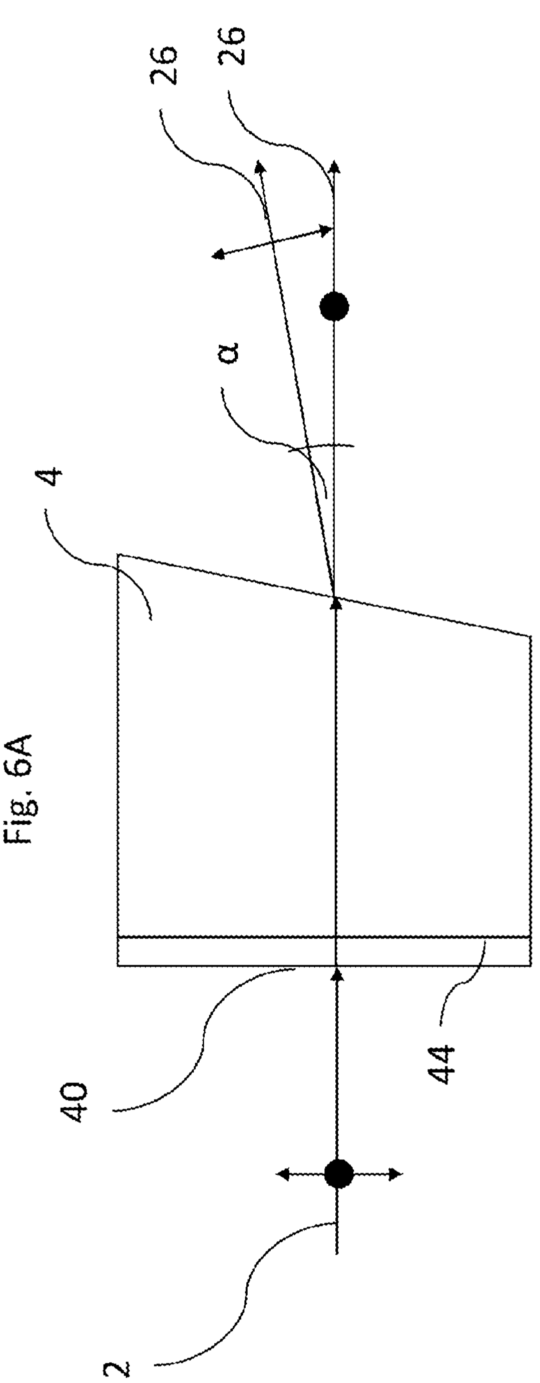
FIGS. 6A and 6B show a schematic representation of the polarizer elements according to some embodiments.

FIGS. 6A, B show birefringent polarizer elements 4, by means of which it is possible to decompose a laser beam 2 into various polarization components. FIGS. 6A, B each schematically show a birefringent polarizer element 4 in the form of a birefringent crystal. Various birefringent materials can be used as crystal workpiece for the polarizer element 4, for example alpha-BBO (alpha-barium borate), YVO4 (yttrium vanadate), crystalline quartz, etc.

The birefringent polarizer element 4 in FIG. 6A has a wedge-shaped embodiment, that is to say a planar beam entrance surface 40 for the entrance of an input laser beam 2 and a planar beam exit surface 42 of the polarizer element 4 are aligned at a (wedge) angle with respect to one another. The or an optical axis 44 of the crystal workpiece is oriented parallel to the beam entrance surface 40. The wedge-shaped birefringent polarizer element is the preferred embodiment here.

The unpolarized or circularly polarized input laser beam 2 entering the birefringent polarizer element 4 perpendicularly to the beam entrance surface 40 is split into two partial laser beams 26, which are perpendicular to one another (s- and p-polarized, respectively), at the beam exit surface 42, which is inclined at an angle with respect to the beam entrance surface 40. In FIG. 5A, as generally customary, the s-polarized partial laser beam 26 is identified by a dot, while the second, p-polarized partial laser beam 26 is identified by a double-headed arrow. The first, p-polarized partial laser beam 26 is refracted to a lesser extent than the second, s-polarized partial laser beam 26 upon emergence from the birefringent polarizer element 4, with the result that an angular offset $\alpha$ occurs between the first and second partial laser beams 26. In this case, the first and second partial laser beams 26 emerge from the birefringent polarizer element 4 at the same location at the beam exit surface 42, that is to say that the angular offset $\alpha$, but no spatial offset, is produced between the two partial laser beams 26.

Figure 6B:
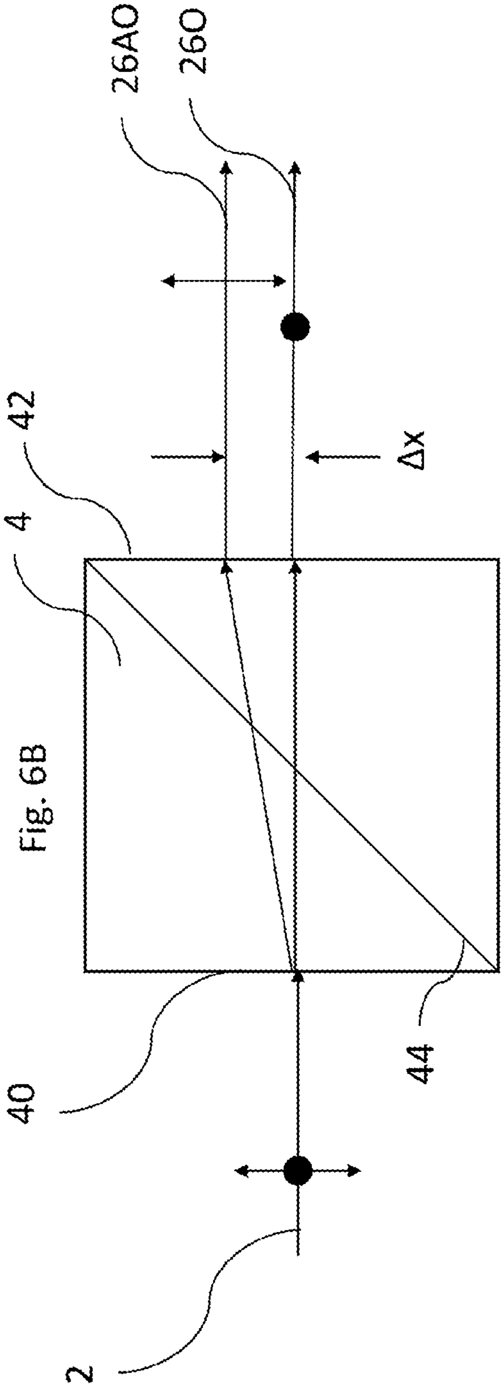

In the case of the polarizer element 4 shown in FIG. 6B, the beam entrance surface 40 and the beam exit surface 42 are aligned parallel to one another and the optical axis 44 of the crystal workpiece is oriented at an angle of 45° with respect to the beam entrance surface 40. In this case, the input beam 2 impinging perpendicularly to the beam entrance surface 40 is split into a first partial laser beam 260 in the form of an ordinary ray and a second partial laser beam 26AO in the form of an extraordinary ray at the beam entrance surface 2*a*. The two partial laser beams 26 emerge parallel, that is to say without an angular offset, but with a spatial offset $\Delta x$ at the beam exit surface 42.

Figure 7:
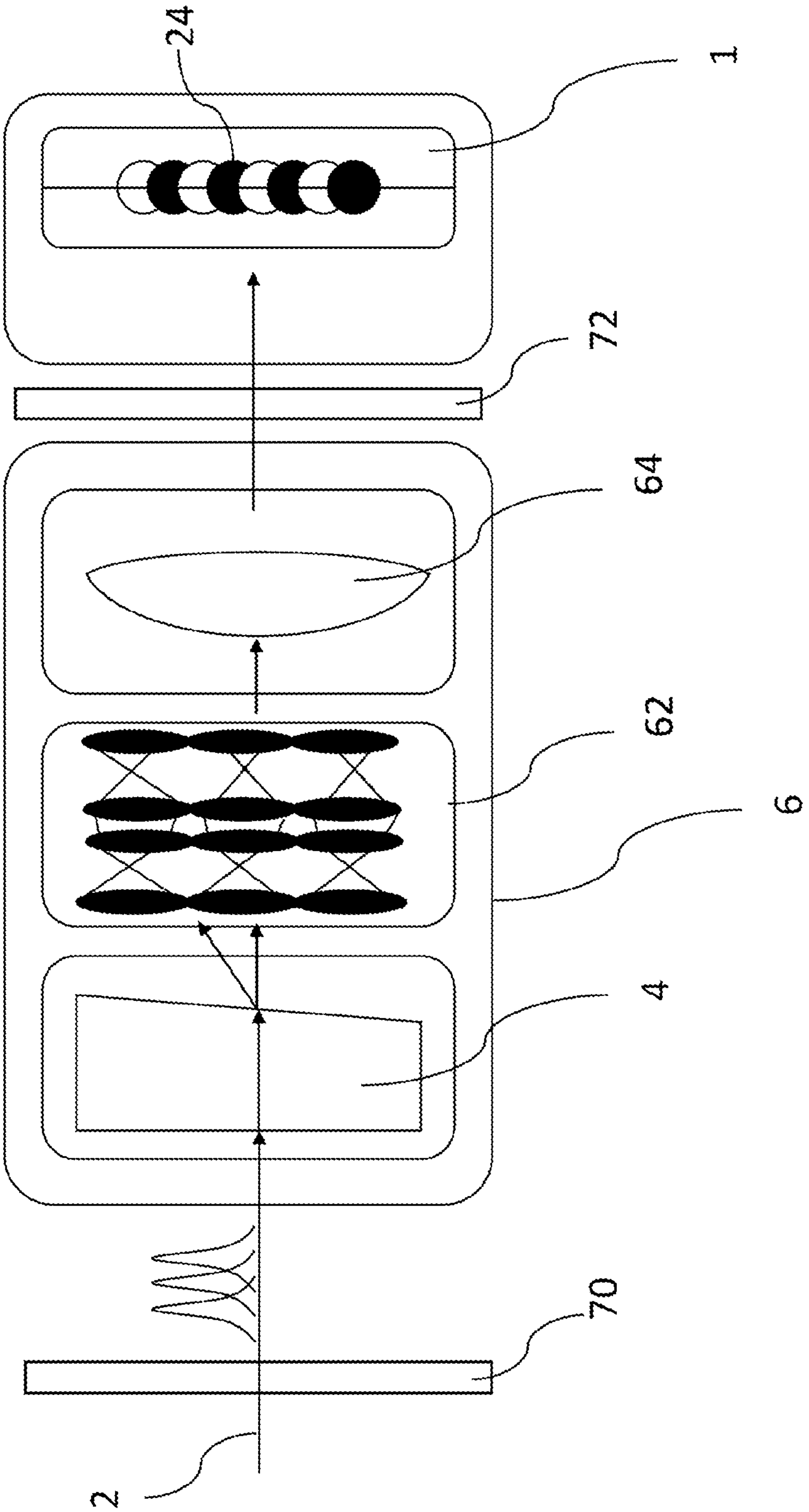
FIG. 7 shows a schematic representation of the processing optical unit and beam path according to some embodiments.

The two birefringent polarizer elements 4 illustrated in FIGS. 6A, B thus differ fundamentally in that the polarizer element 4 shown in FIG. 5A produces an angular offset α (without a spatial offset) and the polarizer element 4 shown in FIG. 5B produces a spatial offset Δx (without an angular offset). Both polarizer elements 4 can form a component of a processing optical unit 6, which can be embodied for example as illustrated in FIG. 7. It goes without saying that the processing optical unit 6 can also comprise polarizer elements which produce both a spatial offset Δx and an angular offset α, as is the case in conventional prism polarizers, which generally comprise two birefringent optical elements.

FIG. 7 in each case shows a processing optical unit 6 comprising a birefringent polarizer element 4 for decomposing the laser beam 2 into partial laser beams polarized perpendicular to one another, a beam splitter optical unit 62 according to FIG. 4 for generating a plurality of pairs of partial laser beams 26 of different polarization, and a focusing optical unit designed to focus the partial laser beams 26 into focal zones 24 which run along a separation line 10 in the focal plane. Moreover, an optional half-wave plate 70 and a switchable polarization filter element 72 are attached upstream of the processing optical unit 6.

The processing optical unit 6 illustrated in FIG. 7 comprises a focusing optical unit 64, which serves for focusing the two partial laser beams 26 onto a focal plane, which lies on the surface 12 of a workpiece 1 to be processed in FIG. 6. Unlike what is shown in FIG. 6, the focal plane may be located above the surface 12 or in the workpiece 1. The input laser beam 2, for example from a pulsed laser or ultrashort pulse laser, is incident on the birefringent polarizer element 4 where two partial laser beams 26 are generated.

In the case of the processing optical unit 6 shown in FIG. 7, the beam splitter optical unit 62 is arranged downstream of the polarizer element 4 in the beam path. However, the beam splitter optical unit 62 may alternatively also be arranged upstream of the polarizer element 4.

The processing optical unit 6 depicted in FIG. 7 can, at least in part, be moved relative to the workpiece 1 such that a movement of the partial laser beams 26 along the separation line 10 is enabled. In particular, the number of partial laser beams can also be varied by way of the beam splitter optical unit such that a power adjustment of the partial laser beams in the case of multiple traverses of the separation line 10 is rendered possible.

In the case of the processing optical unit 6 illustrated in FIG. 7, the birefringent polarizer element 4 is arranged in a plane that is optically conjugate with respect to the focal plane. The optically conjugate plane is linked with the focal plane by an angle-to-position transformation (Fourier transform) generated by the focusing optical unit 7. Angles in the optically conjugate plane correspond to positions in the focal plane, and vice versa. The two partial laser beams 26 emerging from the polarizer element 4 with the angular offset α are therefore focused with a spatial offset Δx of the two centers of the focal zone 24 in the focal plane. In this case, the spatial offset is smaller than the diameter of the focal zones 24, with the result that the two focal zones 24 overlap one another. Owing to the absence of the spatial offset of the two partial laser beams 26 emerging from the polarizer element 4, the two partial laser beams 26, after passing through the focusing optical unit 74, are aligned parallel and perpendicularly to the focal plane 8.

The focal zones 24 of a pair of adjacent partial laser beams of different polarization are formed by partial laser beams 26 which are in each case polarized perpendicularly to one another and which partially overlap. In addition, the focal zones 24 of respectively two partial laser beams 26 polarized perpendicularly to one another in respectively two directly adjacent pairs also overlap one another. In all the focal zones 24 illustrated in FIG. 7, only partial laser beams 26 polarized perpendicularly to one another overlap one another, and so no interference effects occur between the partial laser beams 26 of the same polarization. The substantially linear intensity distribution generated in the focal plane in this way extends along the separation line 10.

Should only one polarization direction be desired in the arrangement of partial laser beams in the workpiece, this can be achieved, for example, by a variation of the half-wave plate 70 and the polarization filter 72. By way of example, the half-wave plate 70 can be used to define a polarization direction of the incident laser beam 2 on the polarizer element 4. By way of example, a p- or an s-polarized beam may thus be incident on the polarizer elements 4, and so there is no split into a plurality of polarizations downstream of the polarizer elements 4. However, it may also be the case that the incident laser beam is rotated by the half-wave plate 70 such that both polarization components are of equal magnitude downstream of the polarizer element 4.

In order to filter out possible undesired polarization directions downstream of the processing optical unit 6, a polarizer 72 can be introduced downstream of the processing optical unit 6. By way of example, the polarizer can be switchable. By way of example, this may mean that the polarizer filters out a first polarization direction from the arrangement of partial laser beams 26 but passes a second polarization. However, precisely the opposite may also be the case. In particular, it may be the case that the polarizer 72 can be removed from the beam path such that both polarization components can be guided to the workpiece unimpeded. However, it may also be the case that switchable means that the polarizer merely has no influence on the partial beams 26.

In a manner analogous to FIG. 7, the alternately polarized intensity profile can also be generated using a birefringent polarization element 4 according to FIG. 6B, in which the partial laser beams leave the birefringent polarization element 4 with a spatial offset. However, since an angular offset is required in the conjugate plane for the purpose of focusing the partial laser beams 26 onto the workpiece 1 in parallel with one another, at least one further lens arrangement is required in order to correct this beam angle of the partial laser beams 26 on the workpiece 1 (not shown).

Figure 8:
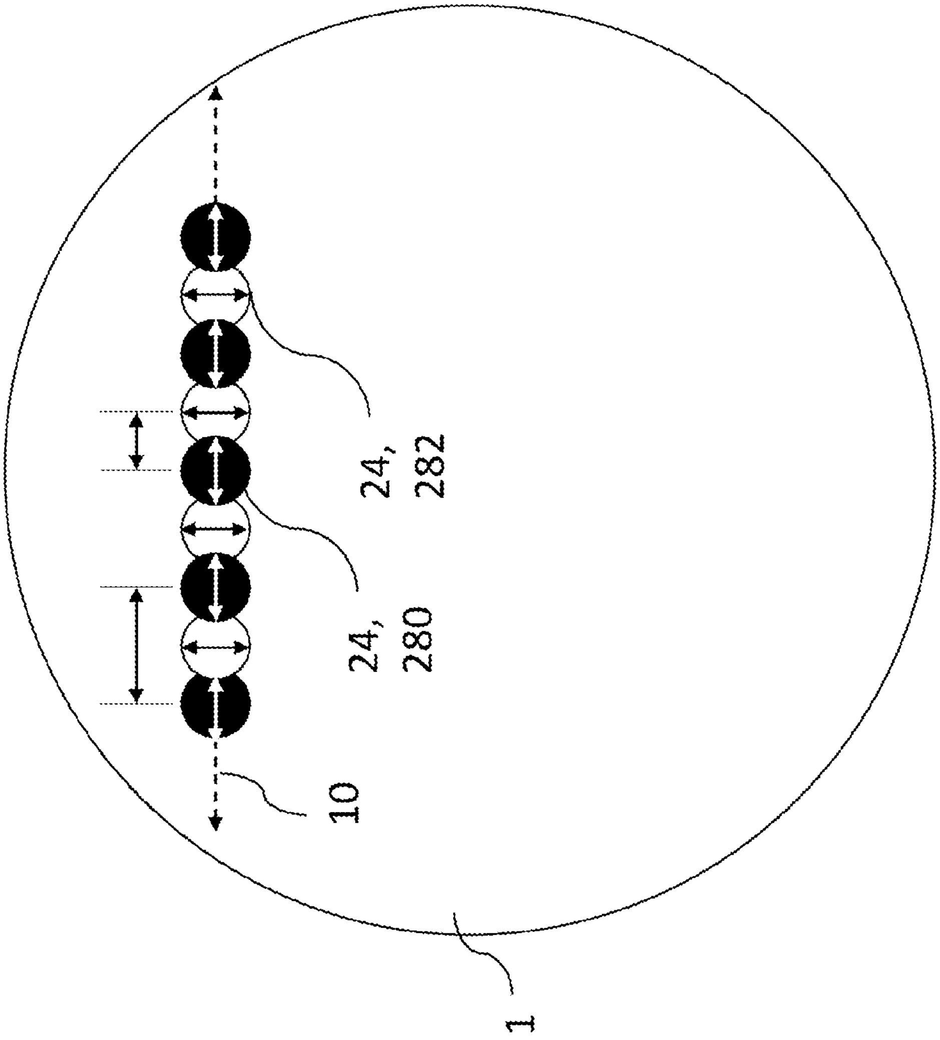
FIG. 8 shows a schematic representation of the method according to some embodiments.

FIG. 8 schematically presents the method in which adjacent partial laser beams have different, more particularly orthogonal polarization directions. The laser beam 2 of the pulsed laser is split into a multiplicity of partial laser beams 26 with the aid of a processing optical unit, for example as shown in FIG. 6, with the adjacent partial laser beams having an orthogonal polarization with respect to one another and with the distance between the adjacent partial laser beams for example being able to be smaller than the diameter of the focal zones 24. This causes adjacent focal zones 24 for partial laser beams 26 with different polarization to overlap. However, there are no bothersome interference effects on account of the different polarization. However, it may also be the case that the various partial laser beams 26 have a significantly larger spacing than the diameter of the focal zones 24. In principle, it is possible to set the distance L of the partial laser beams of different polarization by way of the polarizer element. By contrast, with the aid of the beam splitter optical unit 62 it is possible to adjust the number of partial laser beams and the spacing of the partial laser beams 26 of the same polarization.

The use of partial laser beams 26 with different polarization is advantageous inasmuch as the different polarization direction relative to the separation line 10 has an effect on the ablation depth per pulse and on the quality of the ablation edge. By way of example, a polarization parallel to the feed direction is suitable for generating particularly smooth edges along the separation line. By contrast, a polarization perpendicular to the feed direction can enable particularly efficient material ablation per laser pulse. By filling the positions between two partial laser beams of the same polarization with partial laser beams of another polarization, it is thus possible to obtain efficiency and quality increases of the different polarizations by way of different processing strategies.

Figure 9A:
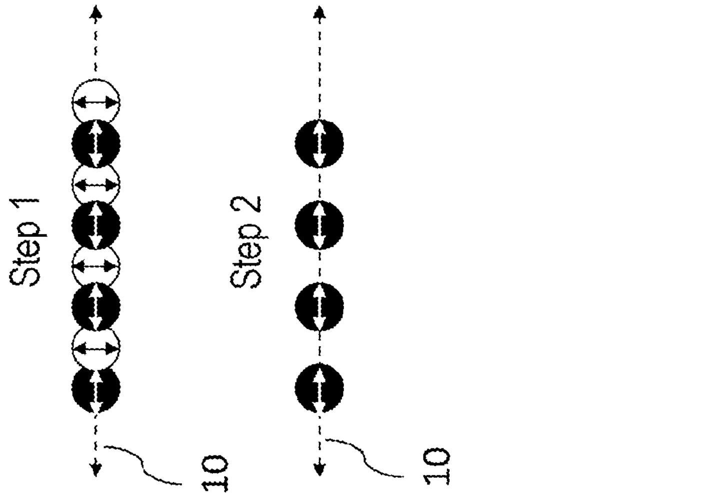
FIGS. 9A, 9B and 9C show a further schematic representation of the method according to some embodiments.

FIG. 9 shows various processing strategies and variations of the method. In FIG. 9A, a multiplicity of partial laser beams 26 are introduced into the workpiece 1 along the separation line 10 in a first step. The adjacent partial laser beams 26 have different polarizations. In particular, the adjacent partial laser beams 26 are introduced into the workpiece 1 at a short distance from one another. The partial laser beams 26 are deflected or periodically deflected along the separation line 10 such that adjacent partial laser beams 26 sweep over the same location on the separation line 10. However, it may also be the case that the deflection is smaller than the spacing of adjacent partial laser beams.

By virtue of the distance being for example so small, the intensity distribution of the partial laser beams is very homogeneous along the separation line 10, with the result that homogeneous material ablation along the separation line 10 is rendered possible. In a second step, it is then possible for example to switch off the polarization components parallel to the separation line 10, for example by virtue of one of the optical elements in the processing optical unit 6 being varied or filtered, such that only partial laser beams 26 with a polarization parallel to the separation line 10 are introduced into the workpiece 1. By virtue of only partial laser beams with a polarization parallel to the separation line 10 being introduced into the workpiece 1 in the second step, it is thus possible to efficiently increase the ablation depth.

Figure 9B:
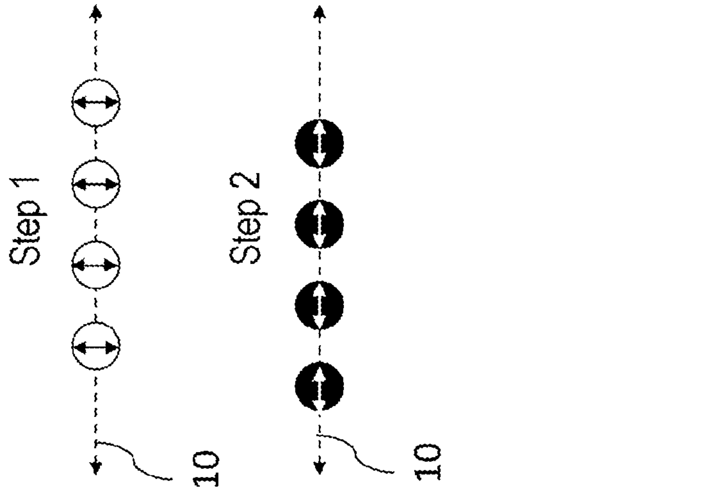

FIG. 9B shows a variation of the method in which, in a first step, use is only made of partial laser beams 26 with a polarization orthogonal to the alignment of the separation line. A high break resistance at the cut edge is generated in the first step as a result of the orthogonal alignment. In a second step, use is subsequently made only of partial laser beams with a polarization parallel to the separation line 10, with the result that the workpiece can be separated with high efficiency.

Figure 9C:
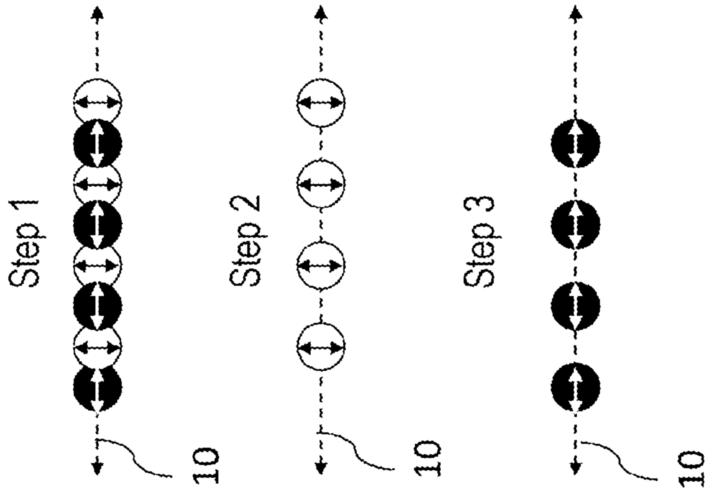

FIG. 9C shows a further variation of the method, with partial laser beams being introduced into the workpiece 1 in a manner analogous to FIG. 9A in a first step, with adjacent partial laser beams being polarized orthogonally to one another. In a second step, it is then possible to generate a high break resistance of the separation edge by means of partial laser beams which are polarized parallel to the separation line 10, with exclusive use being made in a third step of partial laser beams which are polarized perpendicularly to the separation line 10 in order to quickly and efficiently increase the ablation depth. Overall, a high quality of the cut edge is ensured by the various methods of FIGS. 9A, B, C.

Figure 10:
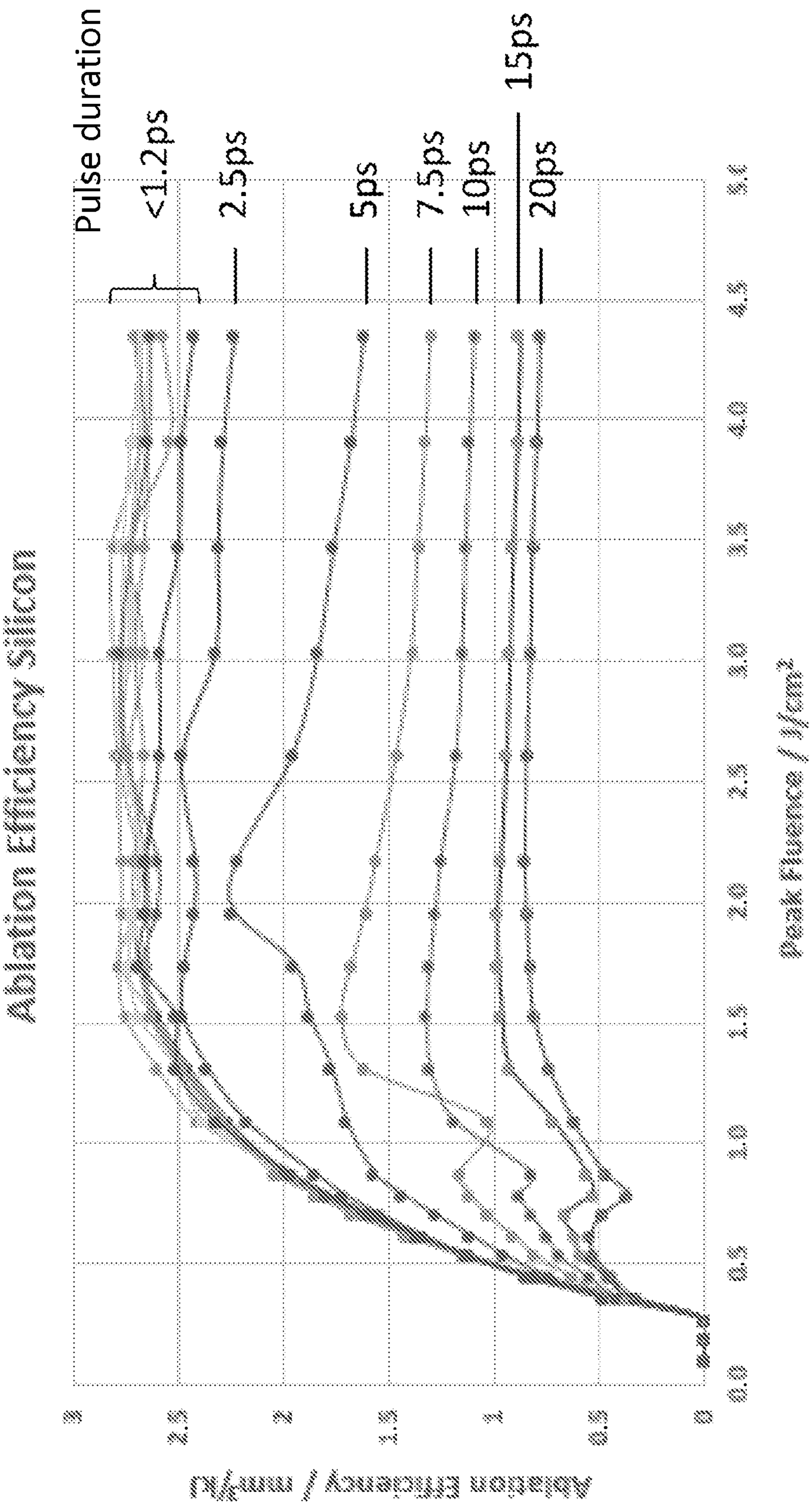
FIG. 10 shows measurement curves for determining the ablation efficiency according to some embodiments.

FIG. 10 shows the ablation efficiency of the method for different pulse lengths and different fluences. It is apparent for all shown pulse lengths that the ablation efficiency in cubic millimeters per kilojoule increases with increasing fluence in joules per square centimeter. This means that the greater the intensity of the partial laser beam, the more material is released from the overall workpiece composite per kilojoule. However, this value stagnates above a fluence of approximately 1.5 J/cm$^2$, and so it is not advantageous to further increase the fluence or the intensity of the partial laser beams. However, in order to further increase the ablation efficiency, it may therefore be advantageous to split up the available energy of the input laser beam among a plurality of partial beams. Then, the ablation efficiency is multiplied by the number of partial laser beams.

In particular, FIG. 10 shows that short pulse durations have a significantly higher ablation efficiency, which is why use is preferably made of pulse durations of less than 1.2 ps.

Figure 11:
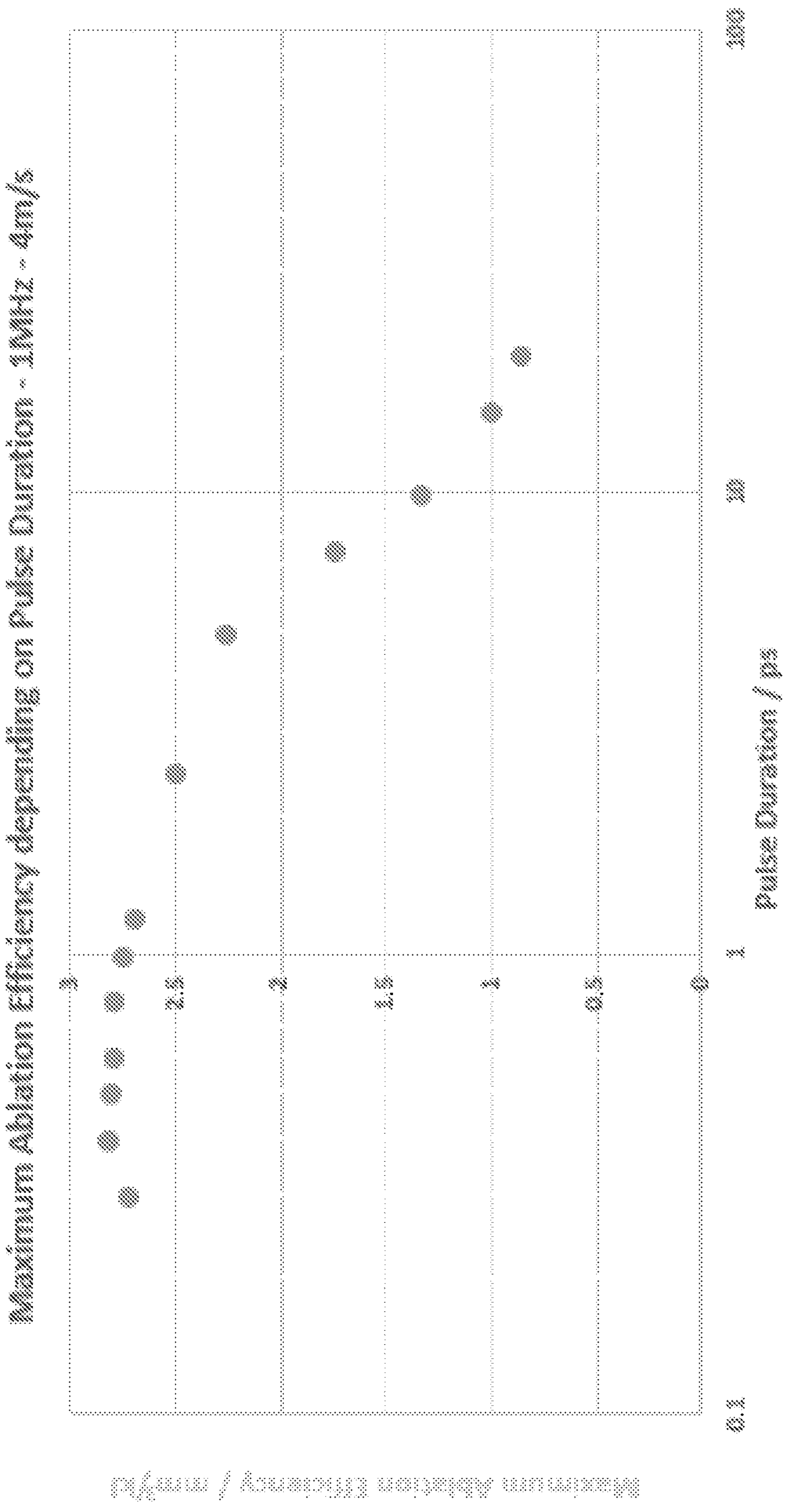
FIG. 11 shows measurement curves for determining the ablation efficiency according to some embodiments.

The data from FIG. 10 is displayed differently in FIG. 11. Here, it is the maximum ablation efficiency that is plotted against pulse length. It is once again evident that for short pulse lengths less than 1.2 ps the maximum ablation efficiency is very high, specifically of the order of 2.5-3 mm$^3$/kJ, while the ablation efficiency drops off for longer pulse lengths.

Figure 12:
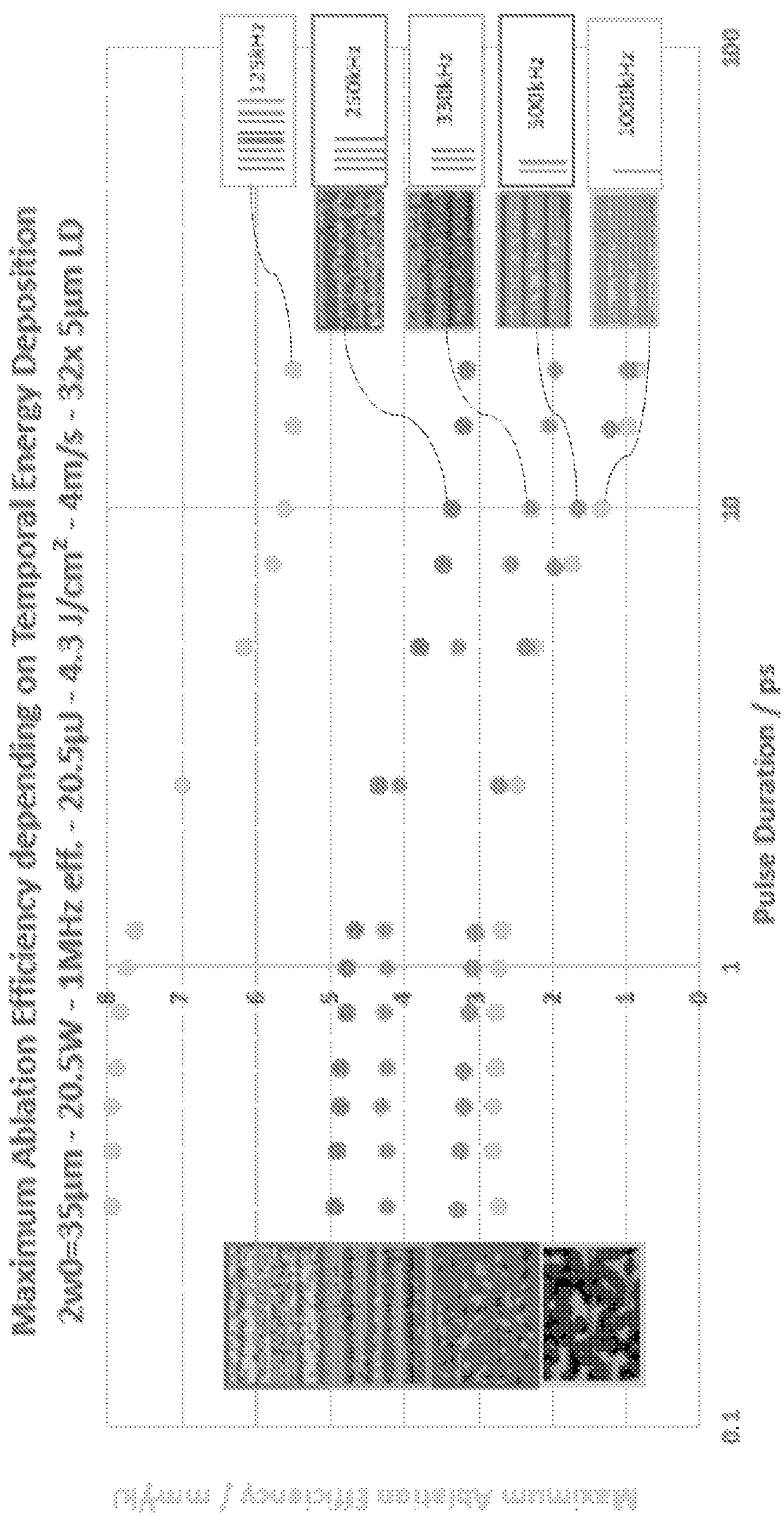
FIG. 12 shows measurement curves for determining the ablation efficiency according to some embodiments.

FIG. 12 shows the maximum ablation efficiency as a function of the repetition rate of the pulsed laser. To this end, the number of partial laser beams and the repetition rate were varied equally. By way of example, a low ablation efficiency with a repetition rate of 1000 kHz is obtained if only one partial laser beam is used. The efficiency of the method is increased if use is made of two partial laser beams with only 500 kHz. A further efficiency increase is possible if use is made of three partial laser beams, each with only 330 kHz. The efficiency is increased yet again if four partial laser beams are introduced into the workpiece with a repetition rate of 250 kHz. The efficiency is increased yet again if eight partial laser beams are introduced into the workpiece with a repetition rate of 125 kHz. In particular, in the case of short pulse lengths of less than 1 ps, the method is four times more efficient with eight partial laser beams than in the case of only one partial laser beam even though the same overall energy was deposited in the workpiece.

Figure 13:
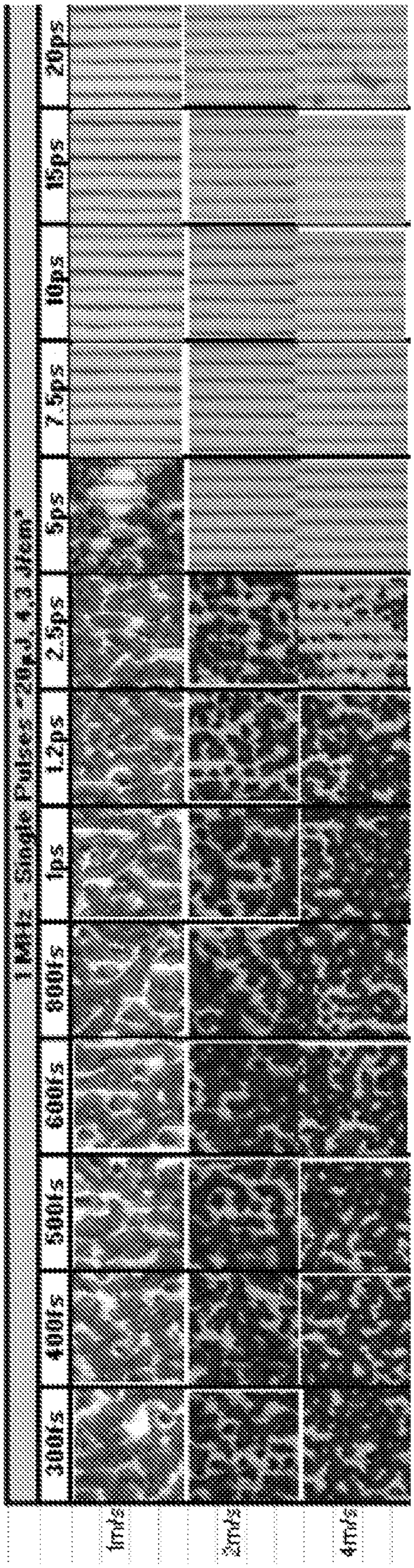
FIG. 13 shows a comparison of the material ablation for different parameters according to various embodiments.

FIG. 13 shows a plurality of samples that were processed with different pulse lengths and different feed speeds. It is quite apparent that there is significantly stronger material ablation for shorter pulse lengths. It is likewise apparent that the partial laser beams generate a contiguous ablation geometry in the case of low feed speeds, while only individual "holes" can be seen in the case of fast feed speeds.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Workpiece
10 Separation line
12 Surface
2 Laser beam
20 Laser pulse
21 Laser
24 Focal zone
26 Partial laser beam
260 First partial laser beam
262 Second partial laser beam
264 Third partial laser beam
280 First polarization
282 Second polarization
3 Displacement
30 Deflection
300 Deflection along the separation line
302 Deflection counter to the separation line
4 Birefringent polarizer element
40 Beam entrance surface
42 Beam exit surface
44 Optical axis
6 Processing optical unit
61 Telescope
62 Beam splitter optical unit
622 Microlens
63 Adjustment mechanism
64 Focusing optical unit
70 Retardation plate
72 Switchable polarization filter
L Distance
MLA Microlens array
D Span between the partial laser beams

The invention claimed is:

1. A method for separating a workpiece along a separation line by using laser pulses of a laser beam, the method comprising:

splitting the laser beam into a plurality of partial laser beams using a beam splitter optical unit, focusing the plurality of partial laser beams onto a surface of the workpiece and/or into a volume of the workpiece using a focusing optical unit, so that the plurality of partial laser beams are arranged next to one another and spaced apart from one another along the separation line, and ablating material of the workpiece along the separation line by introducing the laser pulses of the plurality of partial laser beams into the workpiece, wherein the laser pulses traverse along the separation line multiple times, wherein the laser power per partial laser beam is adjusted for different traversals along the separation line depending on an ablation depth obtained in the workpiece.

2. The method as claimed in claim 1, wherein the laser power per partial laser beam is adjusted by adjusting a number of partial laser beams for a given input power of the laser beam, with the number of partial laser beams being reduced with increasing ablation depth.

3. The method as claimed in claim 1, wherein the laser power per partial laser beam is increased with increasing ablation depth.

4. The method as claimed in claim 1, wherein the beam splitter optical unit comprises a plurality of microlens arrays.

5. The method as claimed in claim 4, wherein the beam splitter optical unit comprises at least two microlens array pairs, wherein each microlens array pair comprises two microlens arrays, the two microlens arrays of a microlens array pair having a fixed distance from one another.

6. The method as claimed in claim 5, wherein the laser power per partial laser beam and/or a number of partial laser beams is adjusted by displacing the two microlens array pairs relative to one another.

7. The method as claimed in claim 4, wherein one microlens array or one microlens array pair of the plurality of microlens arrays comprises convex microlenses.

8. The method as claimed in claim 1, wherein the partial laser beams are focused into a same focal plane.

9. The method as claimed in claim 1, wherein the partial laser beams are moved away from an original position along the separation line by a deflection value, the movement being correlated with a repetition rate of the laser beam so as to ensure uniform material ablation.

10. The method as claimed in claim 9, wherein the deflection value is less than or equal to a distance between two adjacent partial laser beams, and the partial laser beams are subsequently moved back into the original position along the separation line, the movement being a periodic movement.

11. The method as claimed in claim 9, wherein the separation line is straight and the movement of the partial laser beams is a linear deflection.

12. The method as claimed in claim 10, wherein the periodic movement is generated by a periodic movement of the focusing optical unit.

13. The method as claimed in claim 1, wherein the laser pulses are ultrashort laser pulses.

14. The method as claimed in claim 1, wherein the partial laser beams and the workpiece are capable of being displaced relative to one another, with a feed along a feed direction.

15. The method as claimed in claim 1, further comprising decomposing the laser beam and/or the partial laser beams into two mutually orthogonal polarization components by passing the laser beam and/or the partial laser beams through a birefringent polarizer element.

16. The method as claimed in claim 15, wherein the two mutually orthogonal polarization components have an angular offset and/or spatial offset with respect to one another.

17. The method as claimed in claim 16, wherein the focused partial laser beams have an alternating polarization along the separation line, or the polarization of each partial laser beam is aligned along the separation line or orthogonal to the separation line.

18. The method as claimed in claim 16, wherein the overall separation process is divided into various partial separation processes, with each partial process being carried out either with p-polarized partial laser beams or s-polarized partial laser beams.

19. The method as claimed in claim 1, wherein the workpiece comprises a silicon wafer.

* * * * *